US008302095B2

(12) United States Patent  (10) Patent No.: US 8,302,095 B2
Shibuya  (45) Date of Patent: Oct. 30, 2012

(54) WORKFLOW PROCESSING METHOD AND APPARATUS FOR DETERMINING THE EXISTENCE OF DATA IN THE STORAGE LOCATION AND CHANGING THE SETTING INFORMATION AND NAME OF STORAGE LOCATION

(75) Inventor: Yuichiro Shibuya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 570 days.

(21) Appl. No.: 12/500,482

(22) Filed: Jul. 9, 2009

(65) Prior Publication Data

US 2010/0017803 A1  Jan. 21, 2010

(30) Foreign Application Priority Data

Jul. 15, 2008 (JP) ................. 2008-184208

(51) Int. Cl.
  *G06F 9/46* (2006.01)
(52) U.S. Cl. ...................... 718/100; 358/1.16
(58) Field of Classification Search .............. 718/100
  See application file for complete search history.

(56) References Cited

U.S. PATENT DOCUMENTS 6,202,086 B1 * 3/2001 Maruyama et al. ........... 709/206
7,826,103 B2 * 11/2010 Kayama ....................... 358/452
2004/0156066 A1 * 8/2004 Mishima et al. ............. 358/1.13
2005/0111039 A1 * 5/2005 Yoshida ....................... 358/1.16
2007/0229879 A1 * 10/2007 Harmon et al. .............. 358/1.15
2007/0229880 A1 * 10/2007 Harmon et al. .............. 358/1.15
2007/0236725 A1 * 10/2007 Harmon et al. .............. 358/1.15
2008/0270698 A1 * 10/2008 Shirogane et al. ........... 711/114

FOREIGN PATENT DOCUMENTS

| JP | 10-145493 A | 5/1998 |
| JP | 2002-135602 A | 5/2002 |
| JP | 2004-227476 A | 8/2004 |

* cited by examiner

*Primary Examiner* — Meng An
*Assistant Examiner* — Abu Z Ghaffari
(74) *Attorney, Agent, or Firm* — Canon USA Inc. IP Division

(57) ABSTRACT

The present invention allows for storing new document data immediately after the details of processing associated with a box are changed. The present invention provides a workflow processing apparatus executing processing procedures in sequence for data existing in a storage location based on setting information, where the workflow processing apparatus includes a data registration unit changing the setting information, a data acquisition unit determining whether or not data exists in the first storage location when the setting information is changed, and a box operation unit that changes the original name of the first storage location to a new name and that generates the second storage location having the original name when it is determined that the data exists in the first storage location.

10 Claims, 23 Drawing Sheets

FIG. 13

TIME : EXECUTE AT DOCUMENT STORAGE TIME

CONDITION : MONOCHROME IMAGE

DETAILS ON PROCESSING : TRANSFER TO BOX

TRANSFER DESTINATION : IMAGE FORMING
APPARATUS 130b

Box2

FIG. 14

TIME : EXECUTE AT DOCUMENT STORAGE TIME

DETAILS ON PROCESSING : PRINTING

```
TIME : EXECUTE AT DOCUMENT STORAGE TIME
CONDITION : WHEN TRANSMISSION SOURCE
            IS BOX "Box1_200710272100"

DETAILS ON PROCESSING : TRANSFER TO BOX
TRANSFER DESTINATION : Box2_200710272100
```

FIG. 20

TIME : EXECUTE AT DOCUMENT STORAGE TIME

CONDITION : COLOR IMAGE

DETAILS ON PROCESSING : TRANSFER TO BOX

TRANSFER DESTINATION : IMAGE FORMING
APPARATUS 130b

Box2

FIG. 21

TIME : EXECUTE AT DOCUMENT STORAGE TIME

DETAILS ON PROCESSING : TRANSFER TO BOX

TRANSFER DESTINATION : IMAGE FORMING
APPARATUS 130c

Box3

FIG. 22

TIME : EXECUTE AT DOCUMENT STORAGE TIME

CONDITION : WHEN NAME DATA "200710272100" IS INCLUDED IN BOX-NAME DATA OF TRANSMISSION SOURCE

DETAILS ON PROCESSING : TRANSFER TO BOX

TRANSFER DESTINATION : Box1_200710272100

FIG. 23

TIME : EXECUTE AT DOCUMENT STORAGE TIME

CONDITION : WHEN NAME DATA "200710272100" IS INCLUDED IN BOX-NAME DATA OF TRANSMISSION SOURCE

DETAILS ON PROCESSING : TRANSFER TO BOX

TRANSFER DESTINATION : Box2_200710272100

WORKFLOW PROCESSING METHOD AND APPARATUS FOR DETERMINING THE EXISTENCE OF DATA IN THE STORAGE LOCATION AND CHANGING THE SETTING INFORMATION AND NAME OF STORAGE LOCATION

BACKGROUND OF THE INVENTION

1. Field of the Invention

The present invention relates to a workflow processing apparatus having a location where data is stored and a workflow processing method, and particularly relates to a workflow processing apparatus having a function of executing predetermined processing for document data stored in a box and a workflow processing method.

2. Description of the Related Art

In the past, image forming apparatuses that include a printer, a facsimile device, a digital copier, and so forth that are connected to a network and that have a box function so as to store acquired document data into a predetermined box have been available.

Japanese Patent Laid-Open No. 10-145493 discloses a technology for setting a program automatically executed for a facsimile message or the like to each box. Japanese Patent Laid-Open No. 10-145493 further discloses a message accumulation-and-exchange device configured to automatically execute processing at predetermined time. The above-described automatically executed processing includes the following processing.

The first processing is processing performed to delete message data stored in a box before different message data is registered with the box. The second processing is processing performed to transmit an incoming notification in response to a facsimile message transmitted from the owner of the box after the message data is registered with the box. The third processing is processing performed to transmit notification data, if there is any notification data transmitted from an administrator, before the message data is retrieved from the box. The last processing is processing performed to transmit retrieve notification data to the sender of the retrieved message data after the message data is retrieved from the box. Further, processing performed to change the message data retrieved from the box into a data format used by a person who retrieves the message data is shown as an example.

Japanese Patent Laid-Open No. 2002-135602 proposes an information terminal device having a confidential box table which allows for conditionally executing a method of processing image data. The above-described information terminal device can automatically perform predetermined processing for image data stored in a confidential box.

Japanese Patent Laid-Open No. 2004-227476 discloses a device which allows for setting details of processing in advance for document data stored in a box and executing document processing, automatically, for the document data stored in the box when a predetermined execution condition is satisfied. The automatically executed processing includes processing performed to change the document generation date, the document file name, the issuing department, the approval field, the document number, and so forth. The predetermined execution condition denotes the reception of document data transmitted from a transmission source specified in advance, the registration of a predetermined number of document data items with the box, the completion of changing the details of document data stored in the box, and a lapse of predetermined time, and so forth.

However, for changing information about settings on processing for execution of the box, known technologies may not be sufficient for finishing processing on each of document data items that are stored in the box before the setting information is changed. Particularly, if the processing performed before the setting information is changed includes processing performed dependently on the format, the form, etc. of document data, it has been difficult to change the setting information of the box until processing on each of stored document data items is finished.

Further, it has been difficult to store new document data dependent on changed setting information of a box in the box, by using the known technologies, until after processing on each of document data items is finished and the setting information of the box is changed.

SUMMARY OF THE INVENTION

The present invention allows for storing new document data immediately after the details of processing associated with a box are changed.

Therefore, according to a first aspect of the present invention, a workflow processing apparatus executing processing procedures in sequence for data transmitted to a storage location based on setting information includes a change unit configured to change the setting information, a determining unit configured to determine whether or not the data exists in a first storage location when the change unit changes the setting information, and a storage-location operation unit configured to change an original name of the first storage location to a new name and generate a second storage location having the original name when the determining unit determines that the data exists in the first storage location.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 shows exemplary box-document-processing setting file data 1-old which is still to be changed of a first box of a first image forming apparatus according to the second embodiment.

FIG. 14 shows exemplary box-document-processing setting file data 2-old which is still to be changed of a second box of a second image forming apparatus according to the second embodiment.

FIG. 20 shows exemplary box-document-processing setting file data 1-new that has been changed of the first box of the first image forming apparatus according to the second embodiment.

FIG. 21 shows exemplary box-document-processing setting file data 2-new that has been changed of the second box of the second image forming apparatus according to the second embodiment.

FIG. 22 shows exemplary box-document-processing setting file data 1-add for addition of the first box of the first image forming apparatus according to the second embodiment.

FIG. 23 shows exemplary box-document-processing setting file data 2-add for addition of the second box of the second image forming apparatus according to the second embodiment.

DESCRIPTION OF THE EMBODIMENTS

Hereinafter, preferred embodiments of the present invention will now be described in detail in accordance with the accompanying drawings.

Entire Configuration

Figure 1:
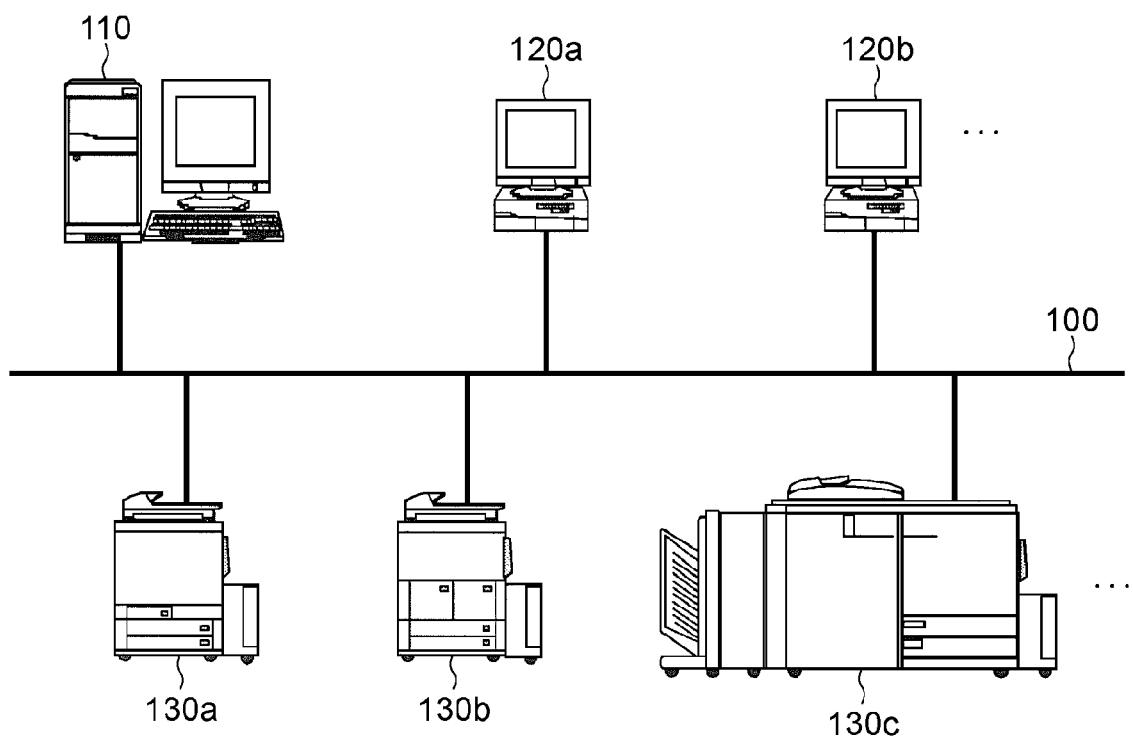
FIG. 1 shows the general configuration of an information processing system according to an embodiment of the present invention.

FIG. 1 shows the entire configuration of a workflow system according to an embodiment of the present invention. The above-described workflow system includes at least one workflow processing apparatus such as image forming apparatuses 130 (130a, 130b, and 130c), at least one client personal computer (PC) used by an end user, such as PCs 120 (120a and 120b), and a management server 110 provided to set processing performed through a box document processing function. The above-described components are connected to one another via a network 100.

The image forming apparatus 130 has a box function provided to store data such as document data in a predetermined storage location (hereinafter referred to as a box). Further, the image forming apparatus 130 executes processing that had already been set for the stored document data. An administration user determines the details on the processing for execution for each of boxes of the image forming apparatus 130 based on, for example, an application specifically designed to operate in the management server 110. A program including the specifically designed application or the like may be provided in an administration server, the PC of an administrator, and so forth.

The client PC 120 is a widely available PC used by an end user. The user can store data in an arbitrary box by using an application or the like such as a printer driver operating in the client PC 120. Further, the user can store document data in the box by using a scanner function and/or a document receiving function of the image forming apparatus 130.

Figure 2:
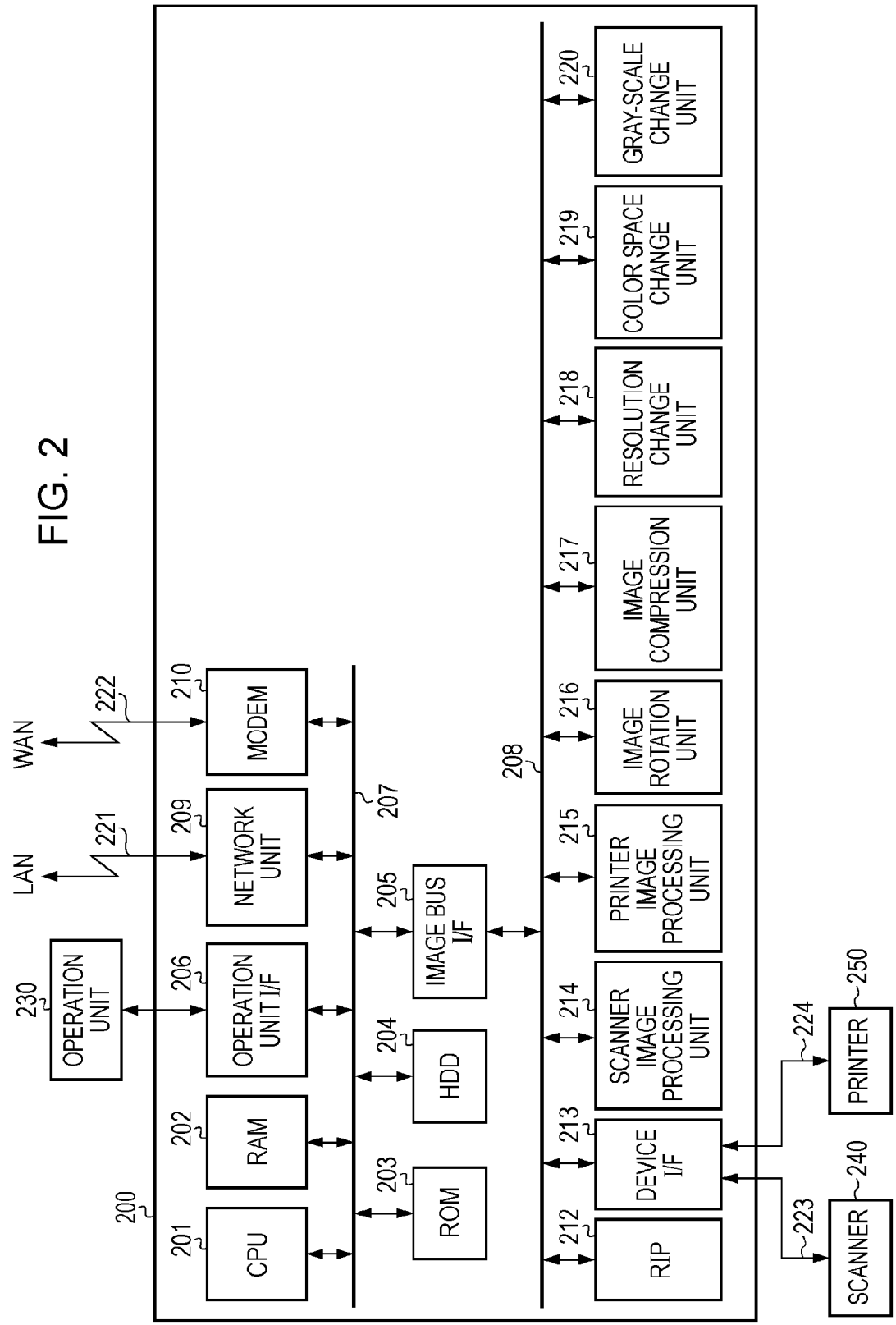
FIG. 2 is a block diagram illustrating the configuration of a workflow processing apparatus (such as an image forming apparatus) according to an embodiment of the present invention.

FIG. 2 is a block diagram showing the configuration of the image forming apparatus 130 including an operation unit 230, a controller unit 200, a scanner 240 provided to transmit image data to the image forming apparatus 130, and a printer 250 provided to produce an output of the image data.

The controller unit 200 is connected to the scanner 240 provided as an image input device and/or the printer 250 provided as an image output device. The controller unit 200 is connected to a local area network (LAN) 221 and/or a public line (wide area network (WAN)) 222, so as to transmit and/or externally transmit image information and/or device information.

The controller unit 200 includes a central processing unit (CPU) 201, a random access memory (RAM) 202, a read only memory (ROM) 203, and a hard disk drive (hereinafter referred to as HDD) 204. The CPU 201 controls the entire system. The RAM 202 is a system work memory used by the CPU 201 when the CPU 201 is working. The RAM 202 is also used as an image memory in which image data is temporarily stored. The ROM 203 is a boot ROM storing a boot program of the workflow system. The HDD 204 is a hard disk drive storing system software and image data.

The controller unit 200 further includes an operation unit I/F 206, a network unit 209, a modem 210, and a system bus 207. The operation unit I/F 206 externally transmits data on an image produced on the operation unit 230 to the operation unit 230 through the operation unit (UI) 230 and the interface unit. The operation unit I/F 206 transmits information transmitted from the user of the above-described workflow system through the operation unit 230 to the CPU 201. The network unit 209 is connected to the LAN 221, so as to transmit and/or externally transmit information. The modem 210 is connected to the public line 222, so as to transmit and/or externally transmit image information. The system bus 207 is provided so as to connect the CPU 201, the RAM 202, the ROM 203, the HDD 204, the operation unit I/F 206, the network unit 209, and the modem 210 to one another.

The controller unit 200 further includes an image bus I/F 205, an image bus 208, a raster image processor (RIP) 212, a device I/F 213, a scanner image processing unit 214, and a printer image processing unit 215. The image bus I/F 205 is a bus bridge that is used to connect the system bus 207 and the image bus 208 provided to transfer image data with high speed to each other and change the data construction. The image bus 209 includes a peripheral-components-interconnect (PCI) bus and/or Institute of Electrical and Electronic Engineers (IEEE) 1394.

The RIP 212 decomposes page-description-language (PDL) code into data of a bitmap image. The device I/F unit 213 connects the scanner 240 and/or the printer 250 provided as an image input-and-output device to the controller 200, and performs synchronous/asynchronous conversion for the image data. The scanner image processing unit 214 corrects, processes, and edits transmitted image data. Further, the scanner image processing unit 214 determines whether the transmitted image data corresponds to a color document or a monochrome document based on the saturation signal of the transmitted image data, and stores data of the determination result. The printer image processing unit 215 corrects, processes, and edits image data for external transmission.

The controller unit 200 further includes an image rotation unit 216, an image compression unit 217, a resolution change unit 218, a color-space change unit 219, and a gray-scale change unit 220. The image rotation unit 216 rotates and stores image data in a memory at the same time as when the image data is read through the scanner 240 in conjunction with the scanner image processing. The image rotation unit 216 rotates the image data stored in the memory, and stores the image data in the memory. Otherwise, the image rotation unit 216 produces a printed output of the image data stored in the memory while rotating the image data in conjunction with the printer image processing unit 215. The resolution change unit 218 performs resolution change processing for the image data stored in the memory and stores the processed image data in the memory. The color space change unit 219 changes YUV image data stored in the memory into Lab image data, for example, by performing matrix calculations, and stores the Lab image data in the memory. The gray-scale change unit 220 changes data of an 8-bit image with 256 gray levels, the data being stored in the memory, into data of a 1-bit image with 2 gray levels by using an error diffusion processing method or the like, and stores the 1-bit image data in the memory. The image compression unit 217 executes compression-and-expansion processing. For example, the image compression unit 217 executes a Joint Photographic Experts Group (JPEG) method for multi-valued image data and the Joint Bi-level Image Experts Group (JBIG) method, the Modified Modified READ (MMR) method, the modified READ (MR) method, and the modified Huffman (MH) method, for binary image data.

The image rotation unit 216, the image compression unit 217, the resolution change unit 218, the color-space change unit 219, and the gray-scale change unit 220 can operate in synchronization with one another. For example, if image data stored in the memory is subjected to an image rotation processing procedure and a resolution change processing procedure, both the processing procedures can be performed via no memory.

Figure 3:
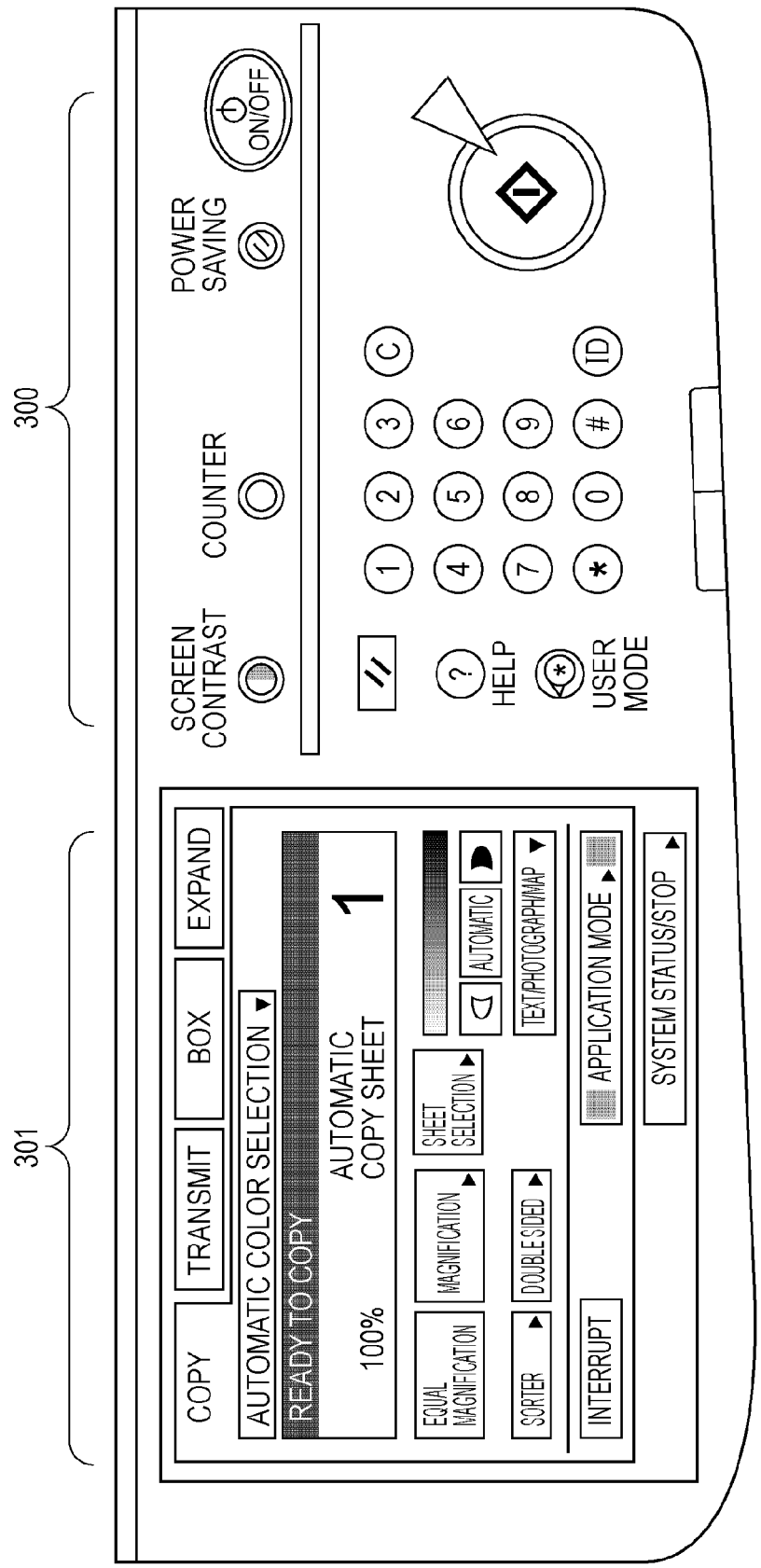
FIG. 3 is a schematic diagram of an operation unit of an image forming apparatus according to an embodiment of the present invention.
Figure 4:
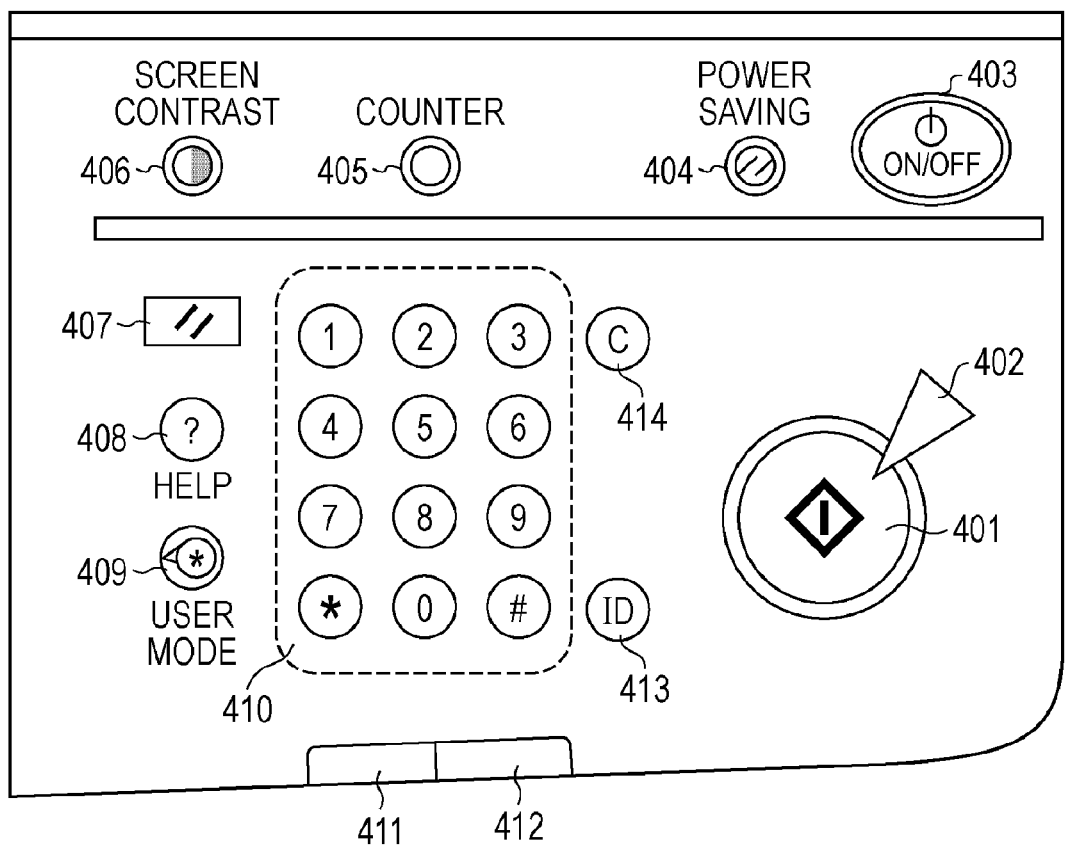
FIG. 4 is a schematic diagram of a key input section of an operation unit of an image forming apparatus according to an embodiment of the present invention.
Figure 5:
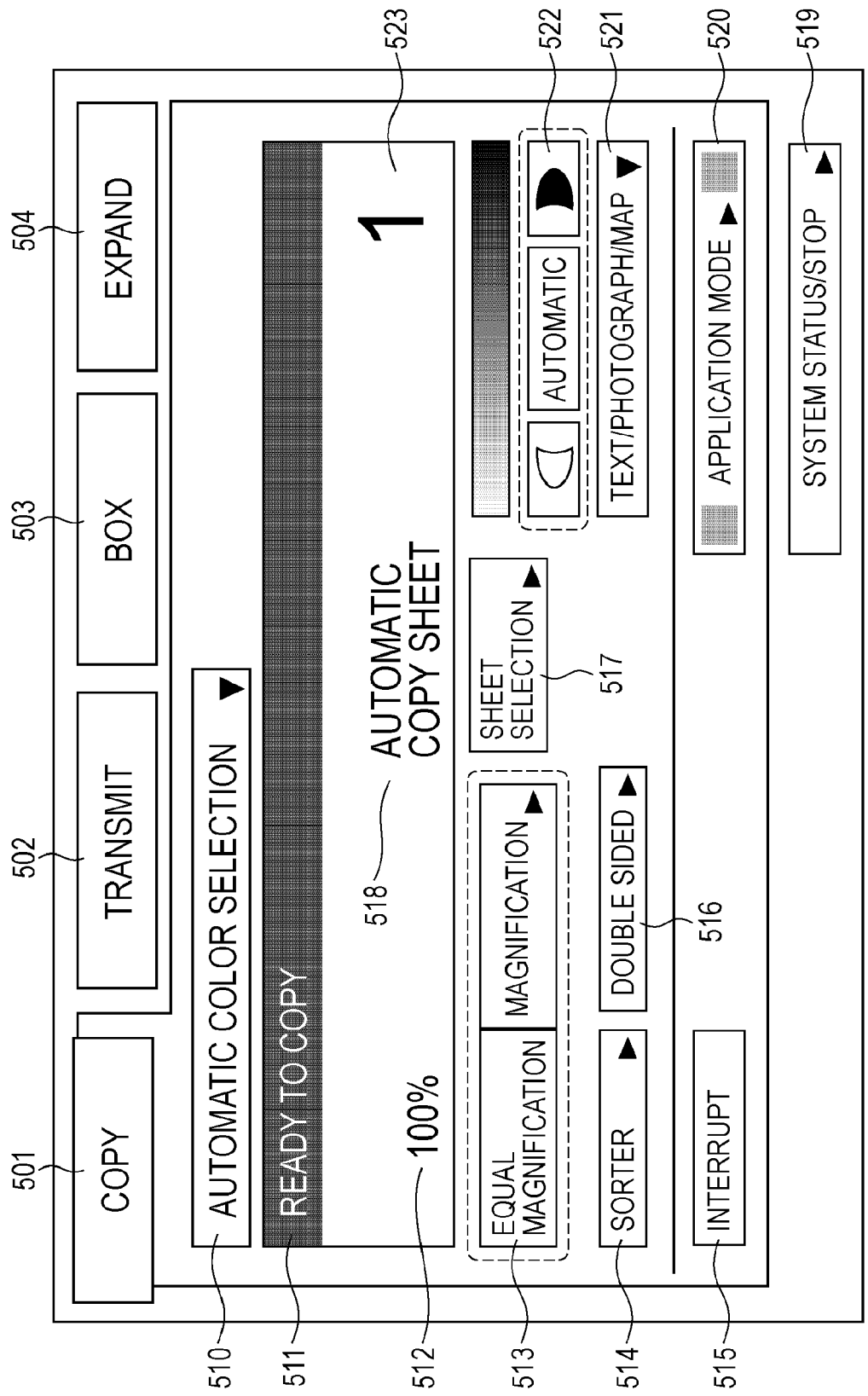
FIG. 5 is a schematic diagram of a touch panel section of an operation unit of an image forming apparatus according to an embodiment of the present invention.

FIG. 3 is a schematic diagram of an operation unit of the image forming apparatus 130 according to an embodiment of the present invention. The operation unit shown in FIG. 3 includes a key input section 300 and a touch panel section 301. FIG. 4 is a schematic diagram of the key input section 300, and FIG. 5 is a schematic diagram of the touch panel section 301. Hereinafter, the details of the key input section 300 and the touch panel section 301 will be described.

The key input section 300 is an input section provided to accept transmitted data of operation performed by a user and/or settings made by the user. The key input section 300 is provided with an operation unit power switch 403 and a power-saving key 404. The key input section 300 is provided with a start key 401, a stop key 402, a numeric keypad 410, a clear key 414, an identification (ID) key 413, a reset key 407, a help key 408, and so forth. A user mode key 409 is provided to switch to a system setting screen provided for each user.

An image contrast dial 406 is used to adjust the visibility of a screen. An execution/memory lamp 411 blinks when a job is executed and/or access to a memory is made so that the user is notified of the job execution and/or the access. An error lamp 412 blinks when an error occurs.

FIG. 5 is a schematic diagram of the touch panel section 300. More specifically, the diagram shows a touch panel display including a liquid crystal display (LCD) and a transparent electrode placed on the LCD. The touch panel display is programmed, in advance, so that when the user touches the transparent electrode at the part corresponding to a key shown on the LCD with a finger, the touch panel display detects the touch and produces a different operation screen. FIG. 5 shows an initial screen produced in standby mode. The touch panel display can produce various operation screens based on a setting operation.

A copy tab 501 is a tab key provided to cause the current screen to transition to an operation screen provided to perform a copy operation. A transmission tab 502 is a tab key provided to cause the current screen to transition to an operation screen provided to give an instruction to perform a send operation such as sending a fax message and/or an electronic mail. A box tab 503 is a tab key provided to cause the current screen to transition to a screen provided to perform an operation so as to transmit and/or externally transmit job data to and/or from a box which is a storage section storing job data for each user. An option tab 504 is a tab key provided to set an expansion function so as to make scanner settings or the like.

The touch panel section 300 includes, in addition to a system monitor key 519 provided to show the state and/or the conditions of the image forming apparatus, a color selection-and-setting key 510, a magnification setting key 513, a post-processing setting key 514, a double-sided setting key 516, a paper-size setting key 517, an image-mode setting key 521, a density setting key 522, an interruption key 515, and an application mode key 520.

A status display section 511 shows a plain state including a standby state, a warm-up state, a jamming state, an error state, and so forth. A magnification display section 512 shows a magnification set through a magnification setting key 513. A paper-size display section 518 shows a paper size and/or mode set through the paper-size setting key 517. A print number display section 523 shows the number of prints, which is specified through the numeric keypad 410, and/or how many prints precede the currently produced print during operations.

Figure 6:
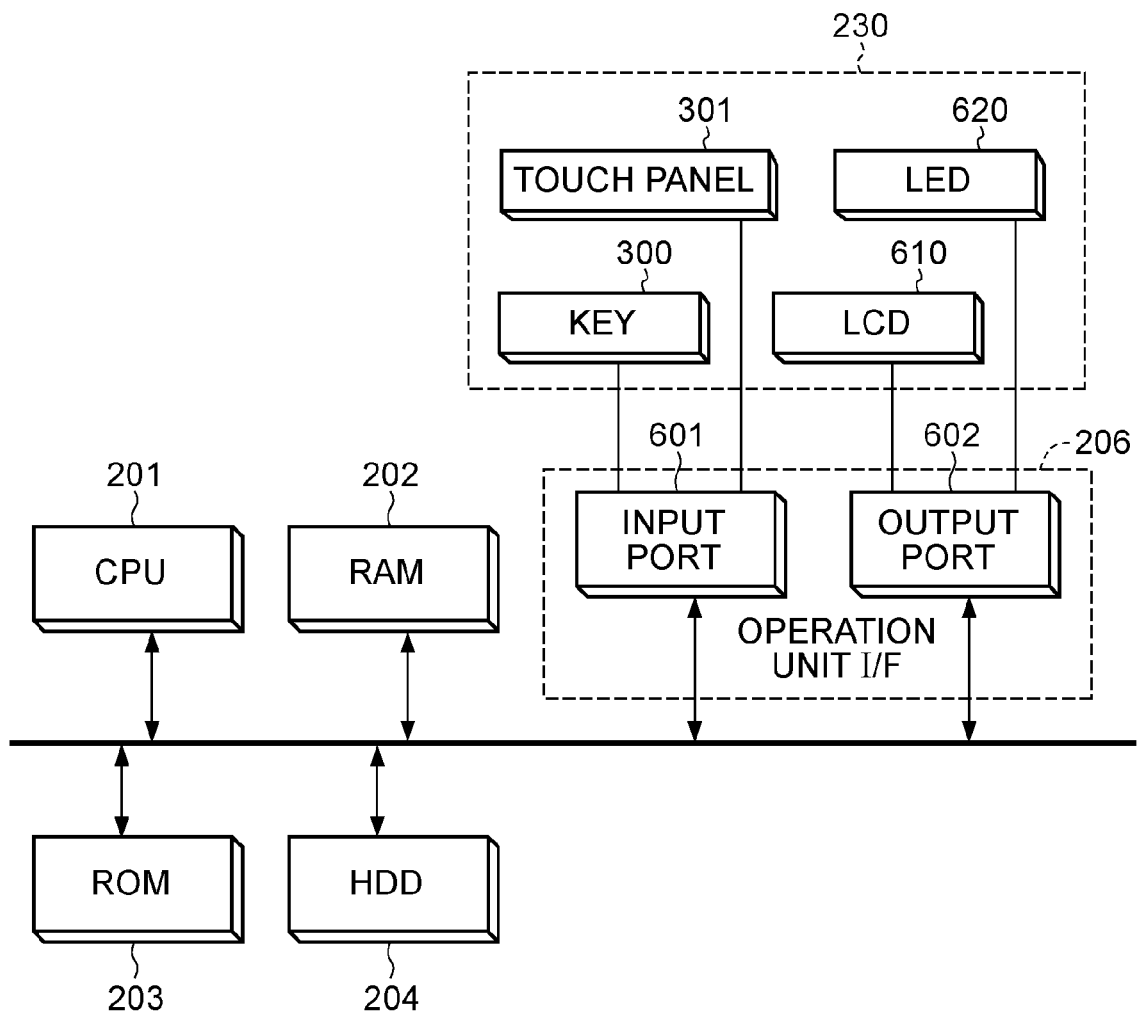
FIG. 6 is a block diagram illustrating the configuration of an operation unit of an image forming apparatus according to an embodiment of the present invention.

FIG. 6 is a block diagram illustrating the configuration of the operation unit 230 of the image forming apparatus 130 according to an embodiment of the present invention.

The image forming apparatus 130 includes a control central processing unit (CPU) 201, a random access memory (RAM) 202, and a read only memory (ROM) 203, and a hard disk drive (HDD) 204. The control CPU 201 collectively controls access to each of devices connected to the system bus 207 based on, for example, a control program stored in the ROM 203. Further, the control CPU 201 reads transmitted information from the scanner 240 connected to the control CPU 201 via an image input section interface 223, and transmits an image signal which is output information to the printer 250 connected to the control CPU 201 via a printer interface 224. The RAM 202 functions as the main memory, the work area, and so forth of the control CPU 201.

The operation unit 230 includes a touch panel section 301, a light-emitting diode (LED) 620, a key input section 300, and an image output device 610. The operation unit 230 accepts data transmitted from the user via the touch panel section 301 and the key input section 300, and acquires data of details on an operation via an operation input section I/F 601. The CPU 201 generates display screen data based on the acquired operation details and the above-described control program, and produces a display screen on the image output device 610 including an LCD, a cathode-ray tube (CRT), and so forth via an output device controller 602 controlling the image output device 610. The operation unit I/F 206 includes an input port 601 and an output port 602 that allow for transmitting information to the CPU 201 and/or receiving information transmitted from the CPU 201.

Figure 7:
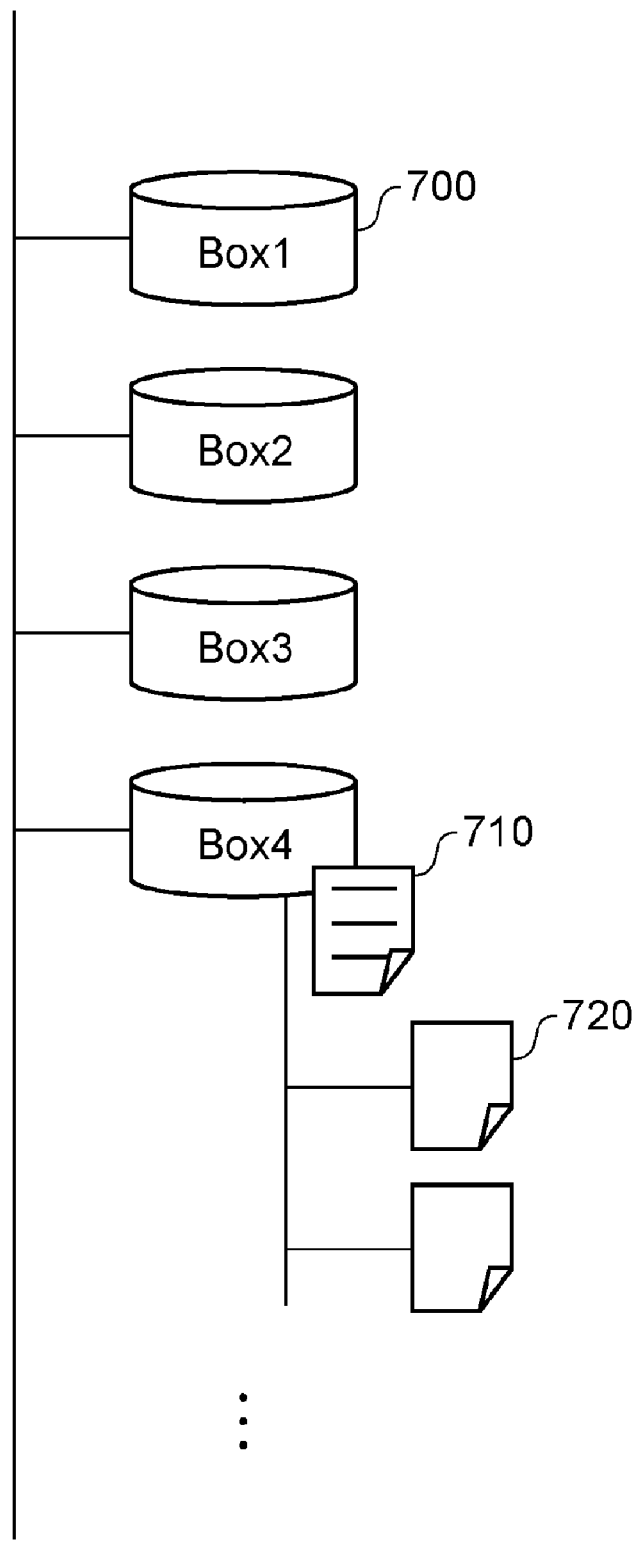
FIG. 7 is a diagram showing box information stored in an image forming apparatus according to an embodiment of the present invention.

FIG. 7 indicates box data stored in the HDD 204 of the image forming apparatus 130. The storage location (hereinafter referred to as a box) of the image forming apparatus 130 includes a plurality of boxes 700. Each of the boxes 700 stores a plurality of data items such as document data items 720. Further, each of the boxes 700 stores the document data items 720 that are transmitted in sequence so as to perform workflow processing. The document data items 720 transmitted to perform the workflow processing are subjected to predetermined processing, and are transmitted to the next box in sequence.

Each of the boxes 700 stores, in addition to document data, box-document-processing setting file data 710 describing the details of processing performed for document data transmitted to and/or stored in the box 700. The above-described box-document-processing setting file data 710 includes information about the time when processing is executed and the details of the processing for execution.

Figure 8:
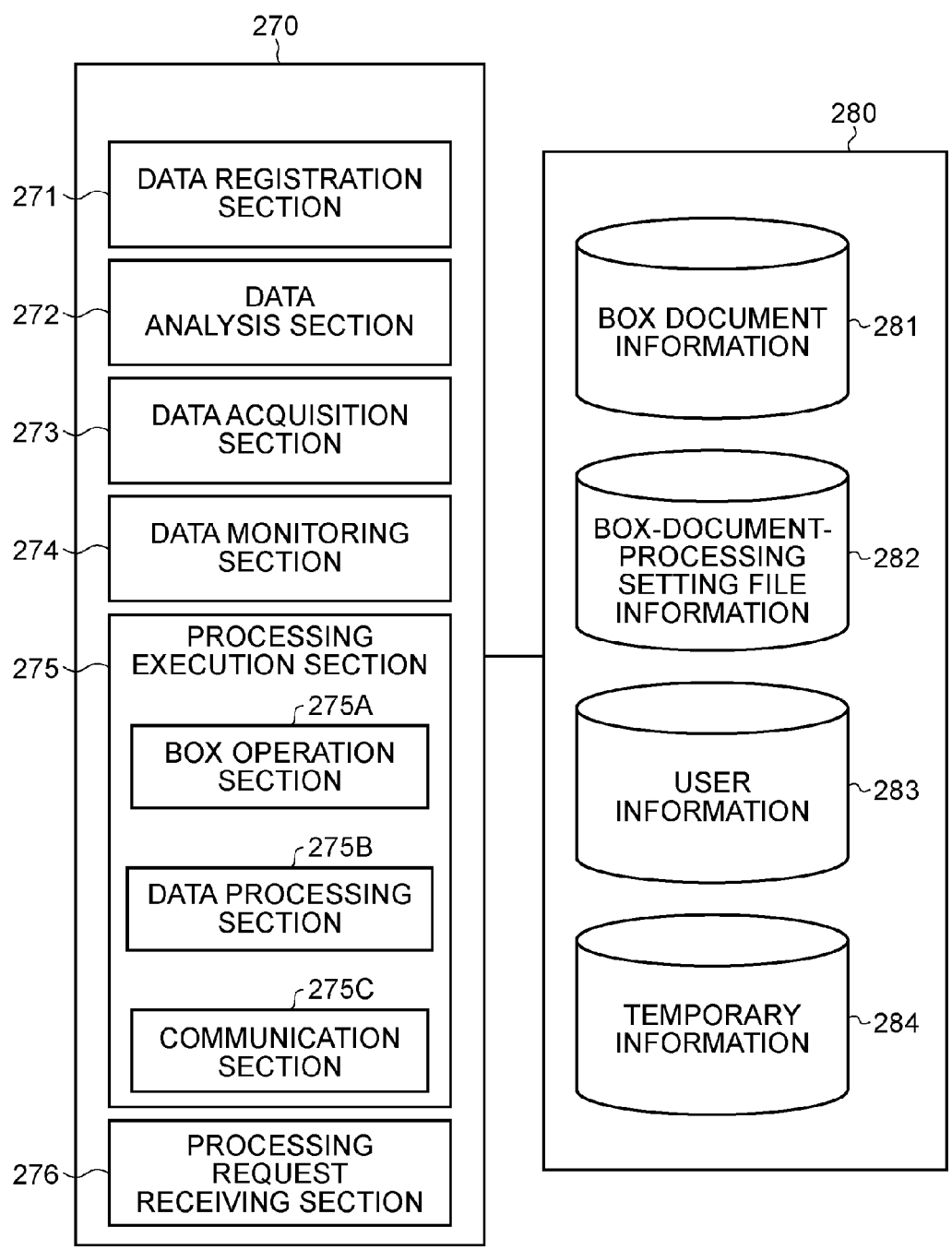
FIG. 8 is a block diagram illustrating box processing software provided in an image forming apparatus according to an embodiment of the present invention.

FIG. 8 is a block diagram of software executed in the image forming apparatus 130. The software is stored in the HDD 204, expanded by the RAM 202, and executed by the CPU 201.

The software allows for performing processing for data stored in and/or transmitted to the box. The software includes a data processing module 270 and an information storage section 280. The data processing module 270 includes a data registration section 271, a data analysis section 272, a data acquisition section 273, a data monitoring section 274, a processing execution section 275, and a processing-request receiving section 276.

The data registration section 271 registers data with the information storage section 280. The data analysis section 272 analyzes the data. The data acquisition section 273 acquires the data from the information storage section 280. The data monitoring section 274 monitors the data stored in the information storage section 280. The processing execution section 275 performs data processing including notification processing, moving-and-deletion processing, and so forth. The processing-request receiving section 276 accepts an external request for processing.

The processing execution section 275 includes a storage location operation section (i.e. a box operation section) 275A, a data processing section 275B, and a communication section 275. The box operation section 275A changes the box name, generates a different box, deletes the box, and inhibits storing different data in the box. The data processing section 275B performs predetermined processing for data and transfers the data to a different image processing apparatus. The communication section 275C transmits a request to perform processing, such as a request to delete a box to a different image forming apparatus.

The image storage section 280 includes box information 281, a box-document-processing setting file information 282, user information 283, and temporary information 284. The box information 281 is information about the box and/or document data stored in the box. The box-document-processing setting file information 282 is file information used to set processing performed for the document data stored in the box. The temporary information 284 denotes temporarily stored information.

The processing execution section 275 executes processing at the time described below. Firstly, the processing execution section 275 executes the processing at the time when an event occurs in an external device, where data of the event is transmitted from the external device to the processing execution section 275. The event includes "when document data is transmitted", "when an electronic mail is transmitted", "when a fax message is transmitted", and so forth. Secondly, the processing execution section 275 executes the processing at the time when an action is initiated toward document data. The action includes "when document data is edited", "when deleting document data", "when document data is printed", and so forth.

Thirdly, the processing execution section 275 executes processing at time relating to a lapse of time, such as "when a predetermined time has elapsed since document data was stored" and "at a predetermined time". Fourthly, the processing execution section 275 executes processing at a different time, such as "when a predetermined instruction is transmitted", "when a user logs in to the image forming apparatus", and so forth.

The processing execution section 275 executes the following processing procedures at the above-described first to fourth times. Firstly, the processing execution section 275 performs an operation relating to document data, such as "editing document data", "deleting document data", "generating new document data", "moving document data", "making a copy of document data", "printing document data", and so forth. Secondly, the processing execution section 275 executes processing which is not directly related to document data, such as "sending a mail (with and/or without an attached file) to a set address" and "calling set process (application)".

First Embodiment

Figure 24:
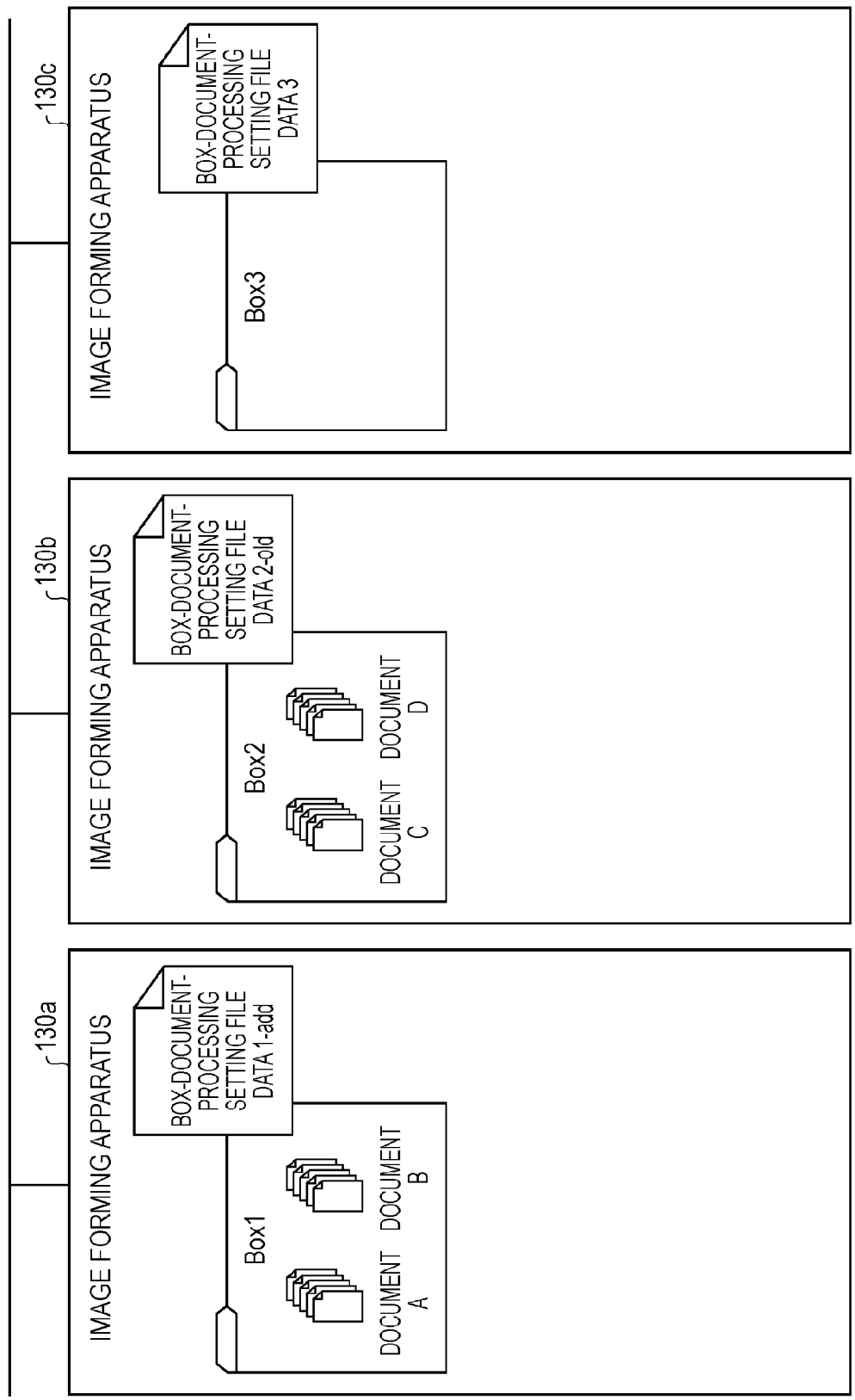
FIG. 24 is a configuration diagram illustrating the relationships between image forming apparatuses and folders according to an embodiment of the present invention.

FIG. 24 indicates the relationships that are established between image forming apparatuses and folders according to a first embodiment of the present invention. In the above-described embodiment, a box 1 provided in the image forming apparatus 130a stores document data items A and B. The first storage location Box 1 stores setting information, that is, box-document-processing setting file data 1-old (shown in FIG. 13) when the document data items A and B are stored.

Figure 9:
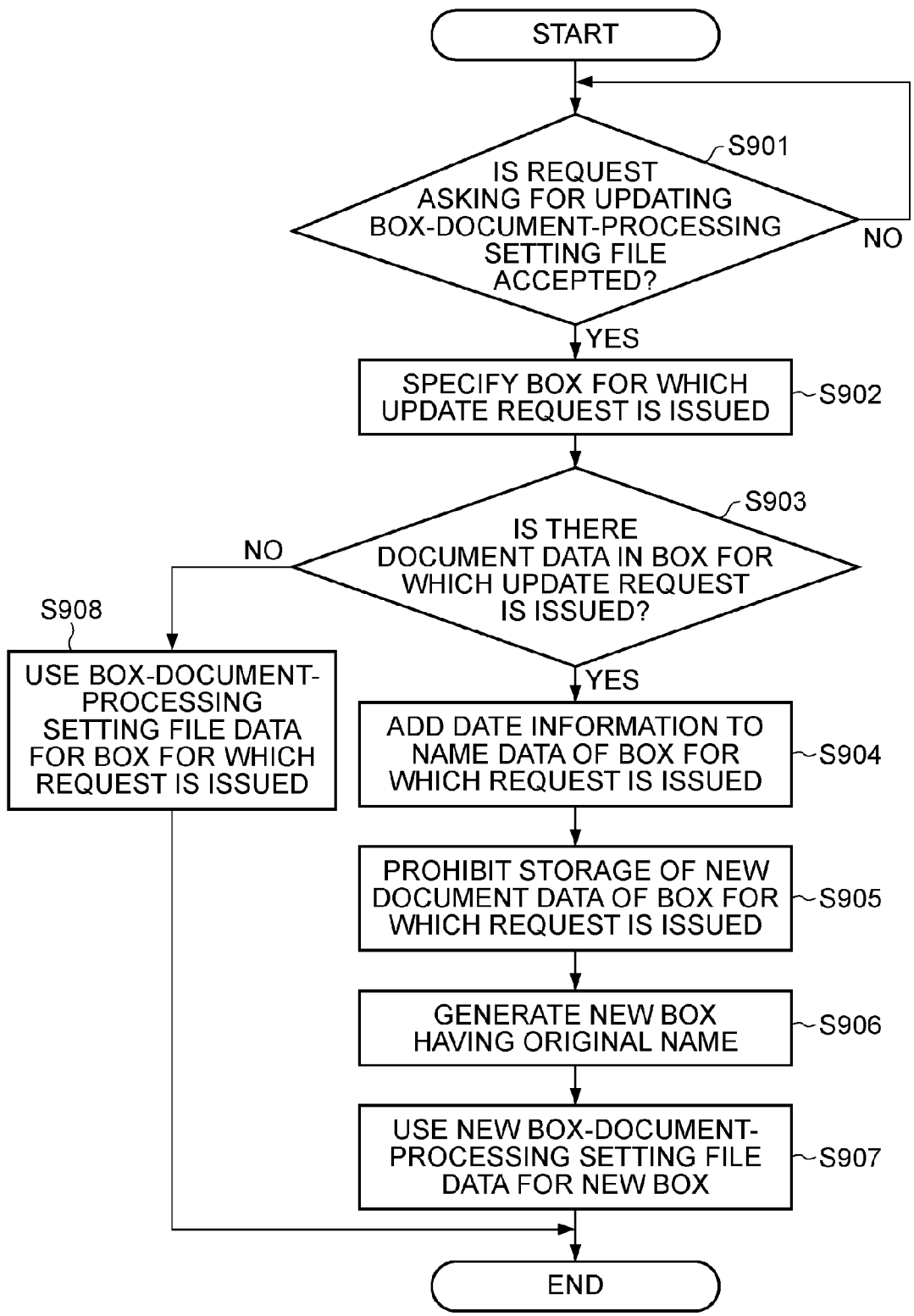
FIG. 9 is a flowchart showing processing procedures performed to update box-document-processing setting file data according to a first embodiment of the present invention.

FIG. 9 is a flowchart showing processing procedures performed to change setting information relating to box document processing. According to the above-described flowchart, an administration user C changes the box-document-processing setting file data for the Box 1 through the management server 110.

At step S901, the processing-request receiving section 276 monitors whether an external request to update the box-document-processing setting file data is accepted. When the administration user C transmits new box-document-processing setting file data to the first storage location such as the Box 1, as an update request, the processing is caused to transition to step S902 so that the data analysis section 272 determines for which box the update request was issued.

After the data analysis section 272 determines that the update request was transmitted to the Box 1 at step S902, the data acquisition section 273 determines whether or not any document data exists in the Box 1 at step S903. The data acquisition section 273 executing step S903 functions as a determining section determining whether or not data exists in the first storage location.

Since the document data items A and B are stored in the Box 1 at that time, the data acquisition section 275 determines that the answer obtained at step S903 is yes, and the processing is caused to transition to step S904. If no data exists in the Box 1 at step S903, the processing is caused to transition to step S908 so that the processing execution section 273 changes the box-document-processing setting file data stored in the box for which the update request was issued, and finishes the processing.

At step S904, the box operation section 275A of the processing execution section 275 adds predetermined information such as information relating to the date and time to data of the original name of the Box 1, the data being included in the box document information 281. More specifically, the predetermined information is information about the time when the request to update the box-document-processing setting file data was issued. For example, if the date and time of the update is Oct. 27, 2007, at 21:00 pm, the box operation section 275A determines the new name of the box to be Box1_200710272100. Namely, the box operation section 275A changes the original name of the Box 1 to the new name. The new name may be generated by adding the predetermined information to the original name, or a different name may be used as the new name.

At step S905, the box operation section 275A of the processing execution section 275 inhibits the storage of new document data, as the state of the Box1_200710272100, which is included in the box document information 281.

At step S906, the box operation section 275A of the processing execution section 275 registers a new box with the box document information 281 by using the original name of the Box 1. Namely, the box operation section 275A generates the second storage location having the original name.

Figure 25:
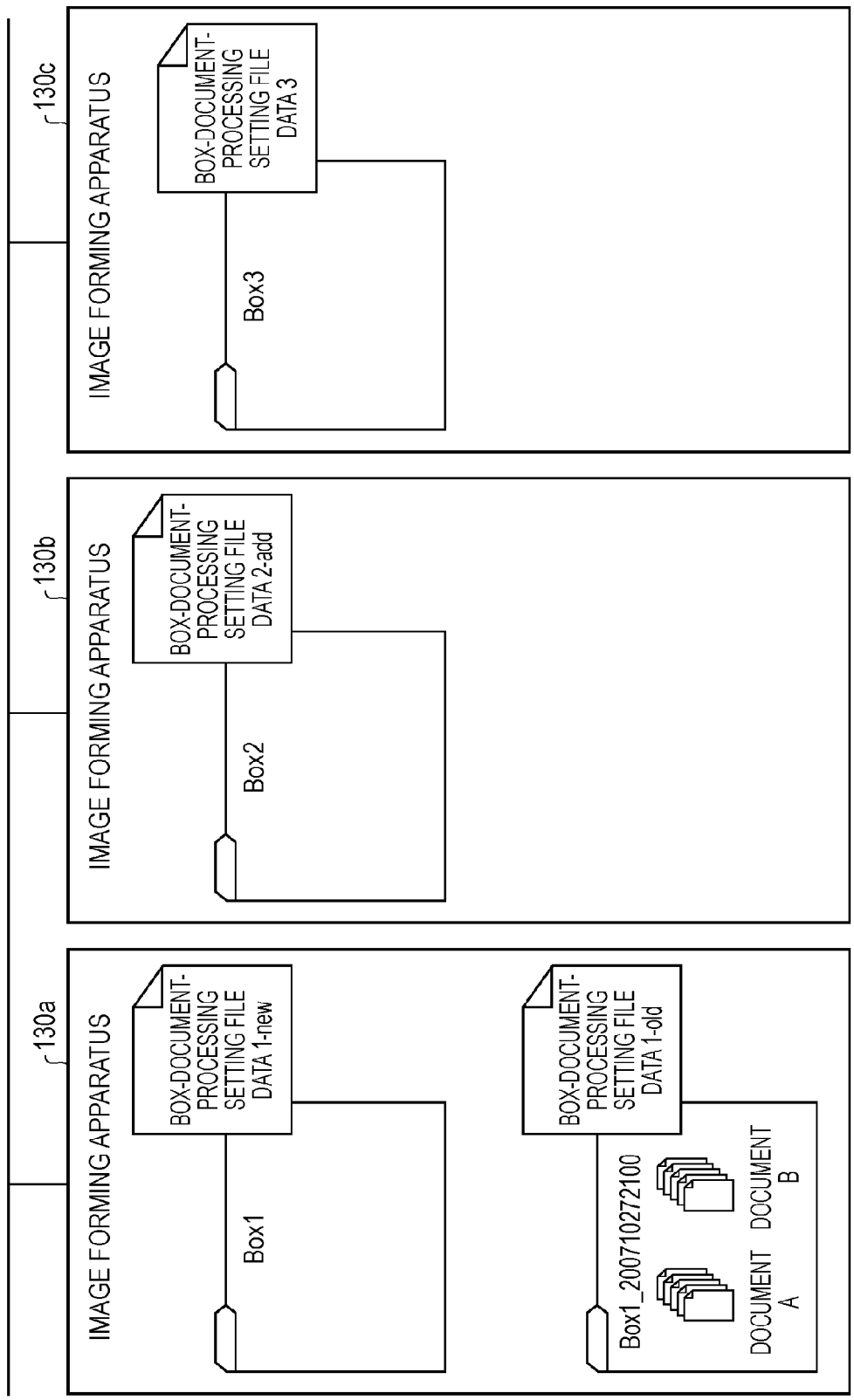
FIG. 25 is a configuration diagram illustrating the relationships between image forming apparatuses and folders, the relationships being established after processing is executed, according to the first embodiment.

At step S907, the data registration section 271 updates new box-document-processing setting file data that had been transmitted as the update request, as the box-document-processing setting file data of the Box1. The data registration section 271 executing step S907 changes the setting information of the second storage location, as a change section. When the above-described processing procedures are finished, the relationships between image forming apparatuses and folders that are shown in FIG. 25 are obtained.

Figure 10:
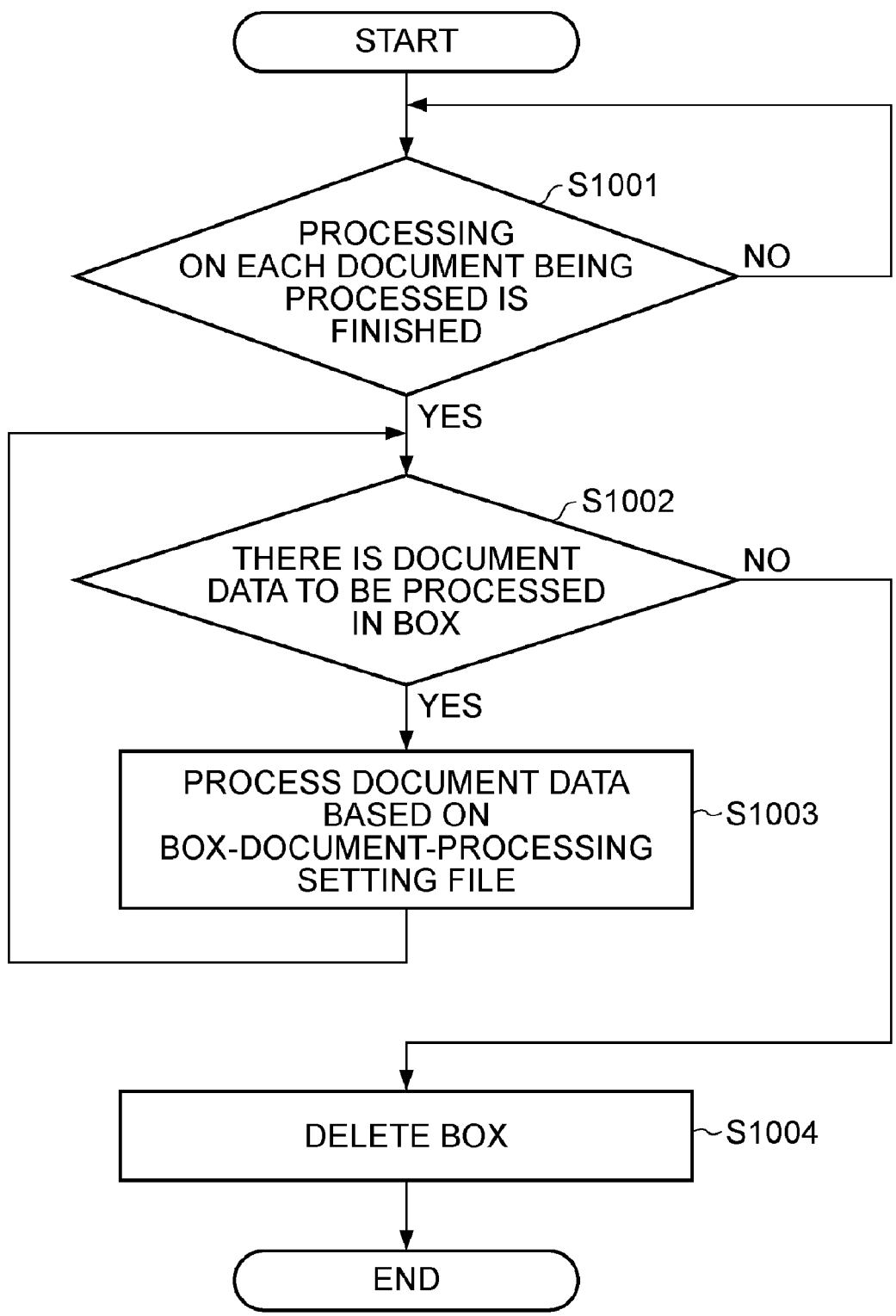
FIG. 10 is a flowchart showing processing procedures performed to delete a box according to the first embodiment.

FIG. 10 is a flowchart showing processing procedures performed to delete a box. The box, where the original name thereof is changed to the new name by the data acquisition section 271 at step S905, becomes unnecessary when each of the document data items that are stored in the box is deleted. The processing procedures performed to delete the box will be described with reference to FIG. 10.

At step S1001, the data monitoring section 274 monitors whether or not document data being processed in the Box1_200710272100 is moved and/or deleted. If the data monitoring section 274 detects that the document data is moved and/or deleted, the data acquisition section 273 determines whether or not different document data is left in the box at step S1002.

If it is determined that the document data is left in the box at step S1002, the document data left in the box is processed by the processing execution section 275 at step S1003 based on the box-document-processing setting file data. After that, the processing returns to step S1002 so that the data monitoring section 274 determines whether or not the document data stored in the box is moved and/or deleted. If the data monitoring section 274 determines that there is no document data in the box at step S1002, the processing is caused to transition to step S1004 so that the box operation section 275A of the processing execution section 275 deletes the Box1_200710272100 included in the box document information 281, and terminates the processing procedures.

Thus, upon receiving the request to update the box-document-processing setting file data when document data is stored in the box, in the first embodiment, the box operation section 275A of the processing execution section 275 changes the name of the box for which the update request is issued, and continues to perform processing on the document data stored in the box. The box operation section 275A generates a new box by using the name of the box for which the update request is issued. Therefore, the processing execution section 275 can continue the processing on the document data stored in the box before a definition update request is issued with a definition used before the update is done. Further, since the new box-document-processing setting file data can be used without delay, the processing execution section 275 can store new document data immediately.

Second Embodiment

A workflow processing apparatus according to a second embodiment of the present invention adjusts the box-document-processing setting file data so that data is transmitted to the box of a different image forming apparatus. Consequently, the workflow processing apparatus operates in synchronization with a plurality of image forming apparatuses. In the above-described embodiment, the workflow processing apparatus changes setting information relating to a plurality of box-document processing procedures.

FIG. 24 shows the relationships between image forming apparatuses and folders, the relationships being established according to the second embodiment. In the above-described embodiment, the document data items A and B are stored in the first storage location Box 1 provided in the image forming apparatus 130a. Document data items C and D are stored in the second storage location Box 2 provided in the image forming apparatus 130b.

When the document data items A and B are stored in the Box 1, setting information, that is, box-document-processing setting file data 1-old shown in FIG. 13 is set to the Box 1. According to the box-document-processing setting file data 1-old shown in FIG. 13, "transfer to box" is specified, as a job executed when document data is stored, on the condition that the document data includes data of a monochrome image, and the Box 2 of the image forming apparatus 130*b* is specified as the transfer destination.

When the document data items A and B are stored in the Box 2, different setting information, that is, box-document-processing setting file data 2-old shown in FIG. 14 is set to the Box 2. According to the box-document-processing setting file data 2-old shown in FIG. 14, "printing" is specified, as a job executed when document data is stored.

Figure 11:
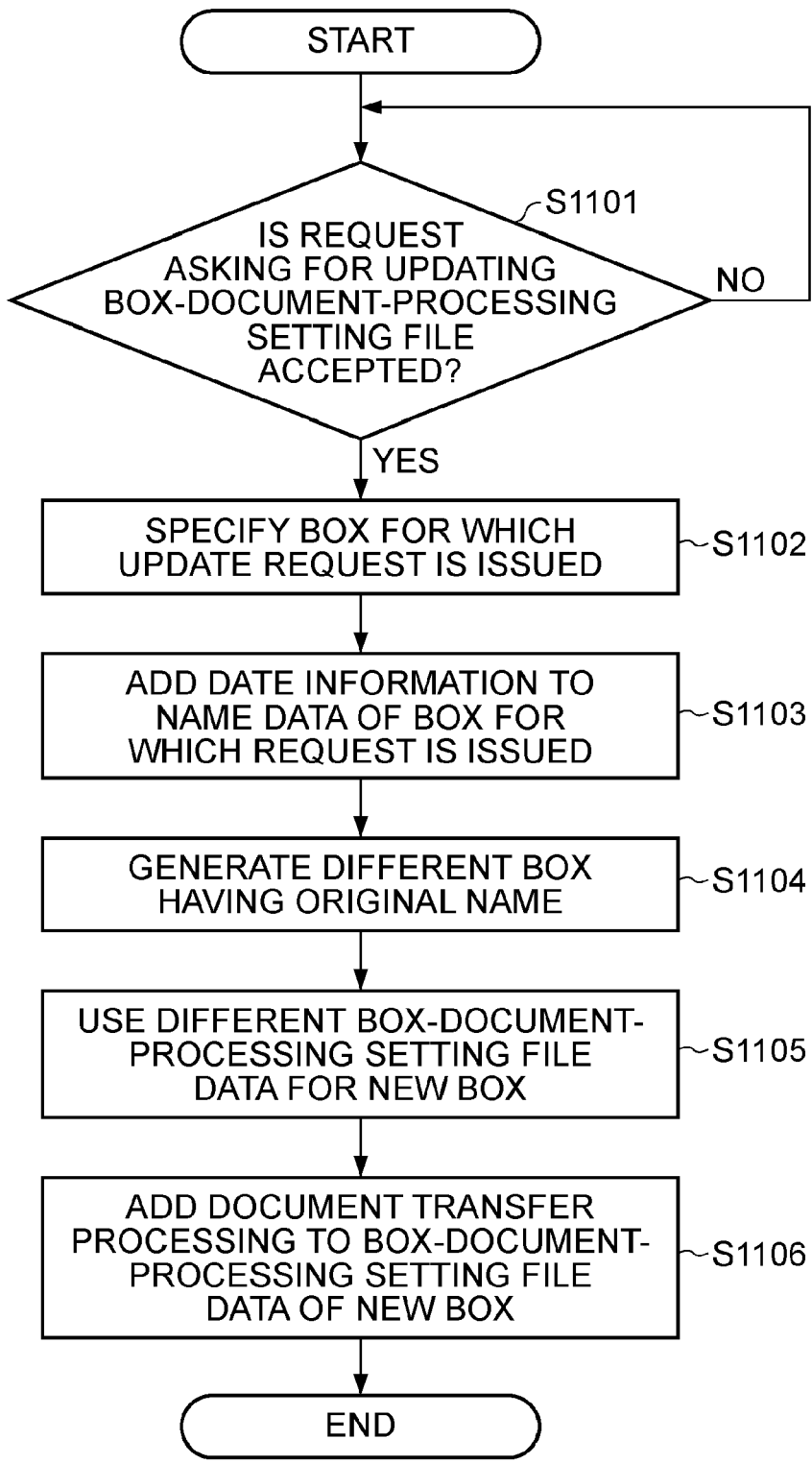
FIG. 11 is a flowchart showing processing procedures performed to update box-document-processing setting file data according to a second embodiment of the present invention.

FIG. 11 is a flowchart showing processing procedures performed to update box-document-processing setting file data used according to the above-described embodiment. The administration user C changes new box-document-processing setting file data through the management server 110 via the network 100 for the Box 1 and the Box 2. The above-described processing procedures will be described with reference to FIG. 11.

At step S1101, the processing-request receiving section 276 monitors whether an external request to update the box-document-processing setting file data is accepted. When the administration user C transmits new box-document-processing setting file data to the Box 1, as an update request, the processing is caused to transition to step S1102 so that the data analysis section 272 determines for which box the update request is issued. The data analysis section 272 determines that the update request is issued for the Box 1 at step S1102, and the processing is caused to transition to step S1103.

At step S1103, the box operation section 275A of the processing execution section 275 adds predetermined information such as information relating to the date and time to data of the original name of the Box 1 included in the box document information 281. More specifically, the predetermined information is information about the time when the request to update the box-document-processing setting file data was issued. Consequently, the original name of the box is changed to a new name. For example, if the date and time of the update is Oct. 27, 2007, at 21:00 pm, the new name of the box is determined to be Box1_200710272100. The new name may be generated by adding the predetermined information to the original name data, or a different name may be used as the new name.

At step S1104, the box operation section 275A of the processing execution section 275 registers the new box with the box document information 281 by using the name of the Box 1. That is to say, the box operation section 275A generates the second storage location having the original name.

At step S1105, the data registration section 271 changes new box-document-processing setting file data 1-new (shown in FIG. 20) that had been accepted as the update request to the box-document-processing setting file data of the Box 1. The data registration section 271 executing step S1105 functions as a change section provided to change setting information of the second storage location.

At step S1106, the data registration section 271 adds data to the box-document-processing setting file data of the Box 1 so that box-document-processing setting file data 1-add (shown in FIG. 22) is generated. The data registration section 271 makes settings so that a higher priority is given to processing performed for the box-document-processing setting file data 1-add than to processing performed for the box-document-processing setting file data 1-new, and terminates the processing procedures.

Figure 26:
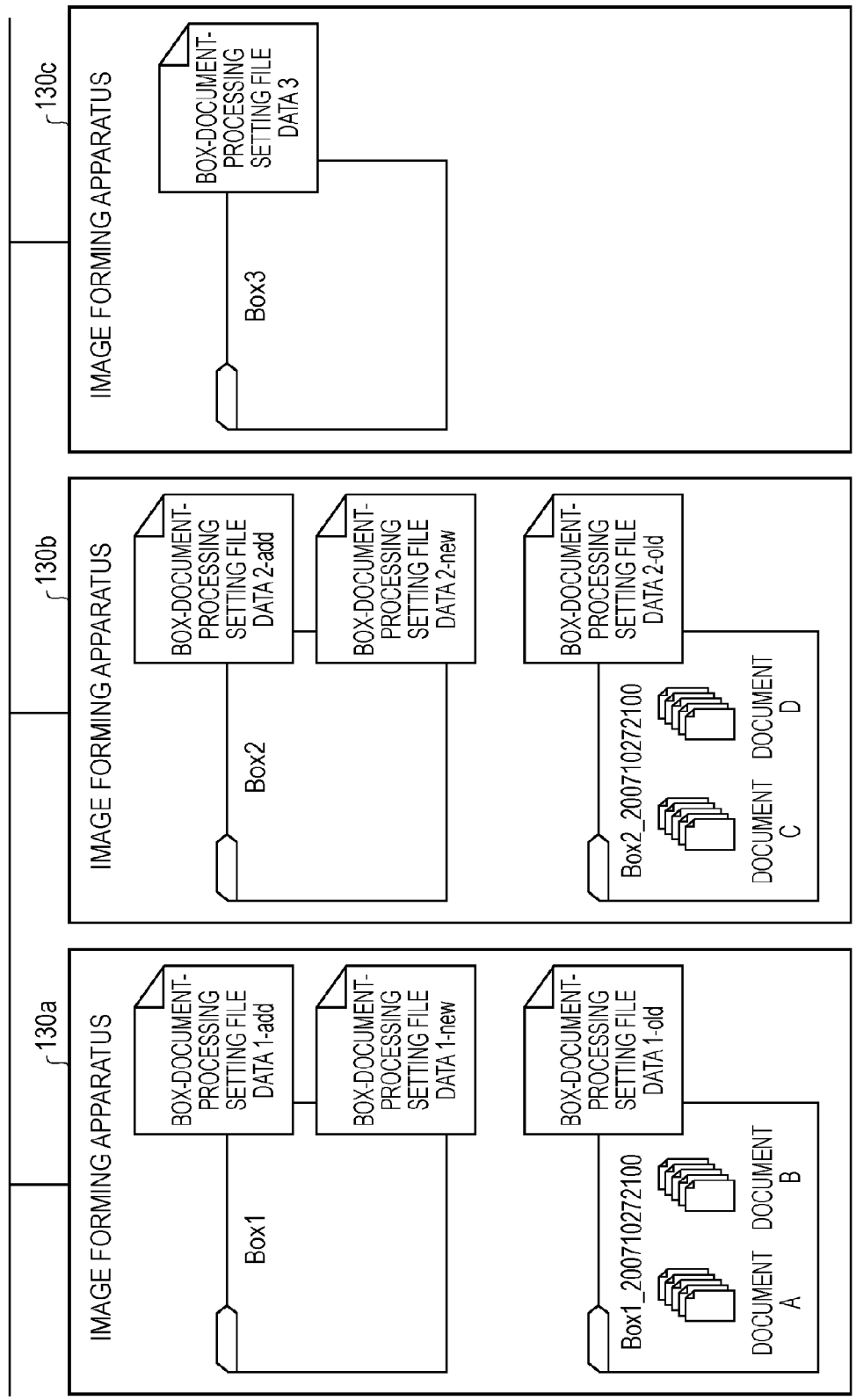
FIG. 26 is a configuration diagram illustrating the relationships between image forming apparatuses and folders, the relationships being established after processing is executed, according to the second embodiment.

The same processing procedures as those shown in FIG. 11 are performed for the Box 2. At that time, the processing execution section 275 determines the name of an existing box to which the box-document-processing setting file data 2-old (shown in FIG. 14) is set to be Box2_200710272100. The processing execution section 275 generates a Box 2 to which new box-document-processing setting file data 2-new (shown in FIG. 21) is set. The data registration section 271 adds data to the box-document-processing setting file data 2-new of the Box 2 so that box-document-processing setting file data 2-add (shown in FIG. 23) is generated. When the above-described processing procedures are finished, the relationships between image forming apparatuses and folders that are shown in FIG. 26 are obtained.

Figure 12:
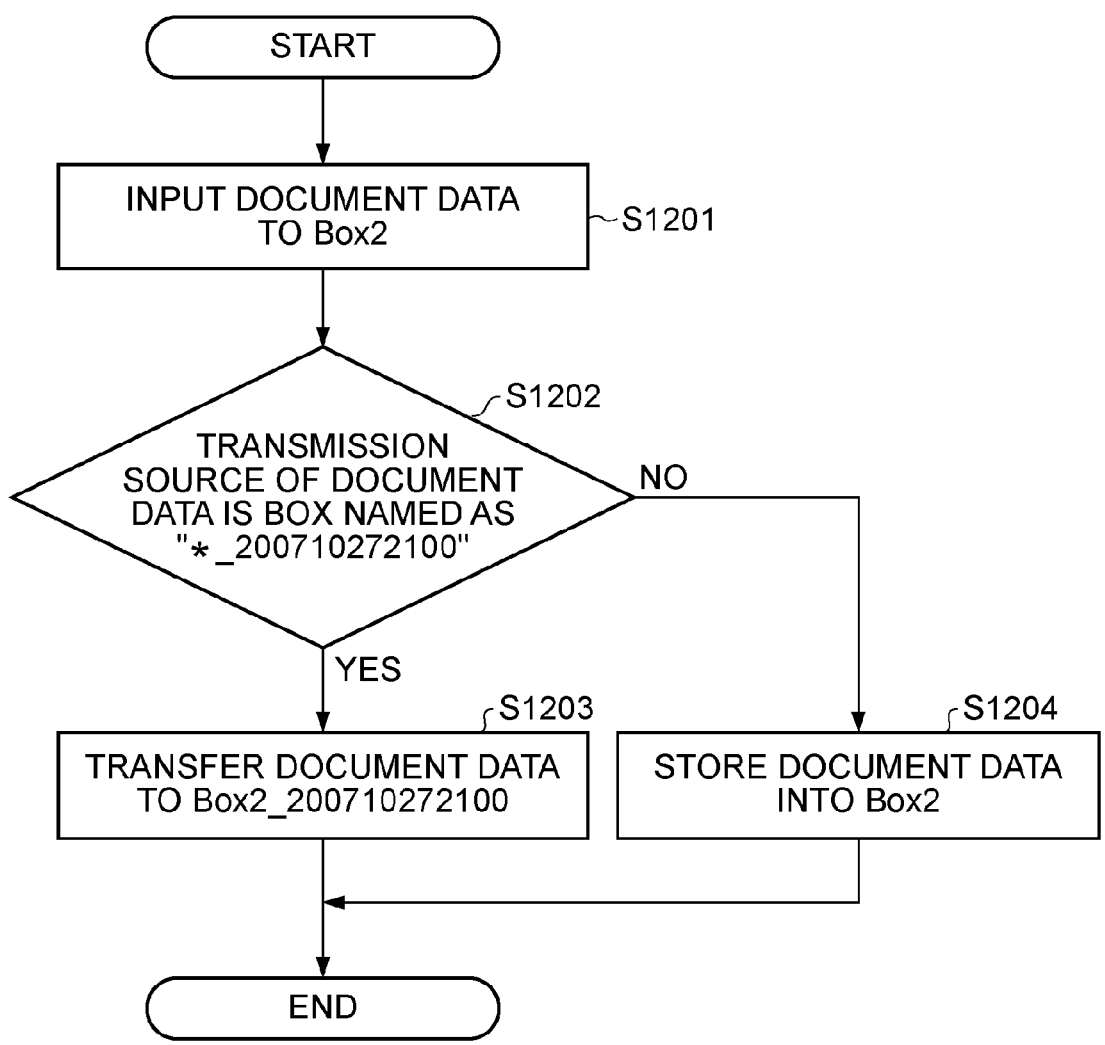
FIG. 12 is a flowchart showing processing procedures performed to transfer document data according to the second embodiment.

FIG. 12 is a flowchart showing processing procedures performed to transfer document data items. In the second embodiment, the document data items are divided among appropriate boxes. For example, in FIG. 26, the document data items A and B that are processed through the Box1_200710272100 should be processed based on the box-document-processing setting file data which is still to be updated. Namely, the document data items A and B are transferred to the Box2_200710272100 in place of the Box 2. Processing performed to transfer the document data items A and B will be described with reference to FIG. 12. The transfer processing includes steps S1202 and S1203.

At step S1201, the data monitoring section 274 monitors whether or not the document data items A and B are transmitted to the Box 2. If the monitoring section 274 detects that the document data items A and B are transmitted, the monitoring section 274 confirms the transmission source of the document data items A and B, which is transmitted from the processing request receiving section 276, at step S1202. The data monitoring section 274 functions as a transmission-source determining section provided to determine a different storage location (for example, the third storage location) which is the data transmission source, at step S1202.

At step S1202, the data monitoring section 274 determines the transmission source, and functions as a monitoring section configured to determine whether or not the data is transmitted from a storage location with a changed name. More specifically, when the data monitoring section 274 determines that the name of the transmission source box of the transmitted document data is "*_200710272100" (* denotes a character string including at least one character), the data processing section 275B of the processing execution section 275 transfers the transmitted document data to the Box2_200710272100 at step S1203. If document data other than the above-described document data is transmitted, the data processing section 275 of the processing execution section 275 stores the document data in the Box 2 and performs processing based on the box-document-processing setting file data set to the Box 2 at step S1204.

For example, as for the document data items A and B that had been stored in the Box 1 before the box-document-processing setting file data was updated, the name of the box storing the document items A and B is Box1_200710272100. Therefore, the document data items A and B are temporarily transferred to the Box 2, and further transferred to the Box2_200710272100. Further, document data stored in the Box 1 after the box-document-processing setting file data is updated is transferred to the Box 2 and stored in the Box 2 without being transferred to another box.

Thus, if the request to update the box-document-processing setting file data is issued and transmitted to a plurality of boxes, information about the update date is added to the data of the name of each of the boxes to which the request is transmitted, and the processing performed for the document data stored in each of the boxes is continued. Document data operating in the box-document-processing setting file data that has yet to be updated is transferred to the above-described box.

Thus, the above-described embodiment allows for continuing the processing on the document data which had been stored before the update was done with a definition which had been used before the update was done even though the request to update the box-document-processing setting file data is transmitted to a plurality of box. Further, since the new box-document-processing setting file data can be used without delay, new document data can be stored immediately.

Third Embodiment

A third embodiment of the present invention further provides a function of transmitting a notification from the transmission source of a box in addition to the same functions as those of the second embodiment, the notification indicating that there is no document data being processed based on the box-document-processing setting file data which is still to be updated. The above-described function allows for automatically deleting a box to which document data is evacuated.

FIG. 24 shows the relationships between image forming apparatuses and folders, the relationships being established according to the third embodiment. In the above-described embodiment, the document data items A and B are stored in the first storage location Box 1 provided in the image forming apparatus 130*a*. The document data items C and D are stored in the second storage location Box 2 provided in the image forming apparatus 130*b*.

When the document data items A and B are stored, the box-document-processing setting file data 1-old shown in FIG. 13 is set to the Box 1. When the document data items A and B are stored, the box-document-processing setting file data 2-old shown in FIG. 14 is set to the Box 2. The administration user C changes new box-document-processing setting file data for the Box 1 and the Box 2 through the management server 110 via the network 100.

Figure 15:
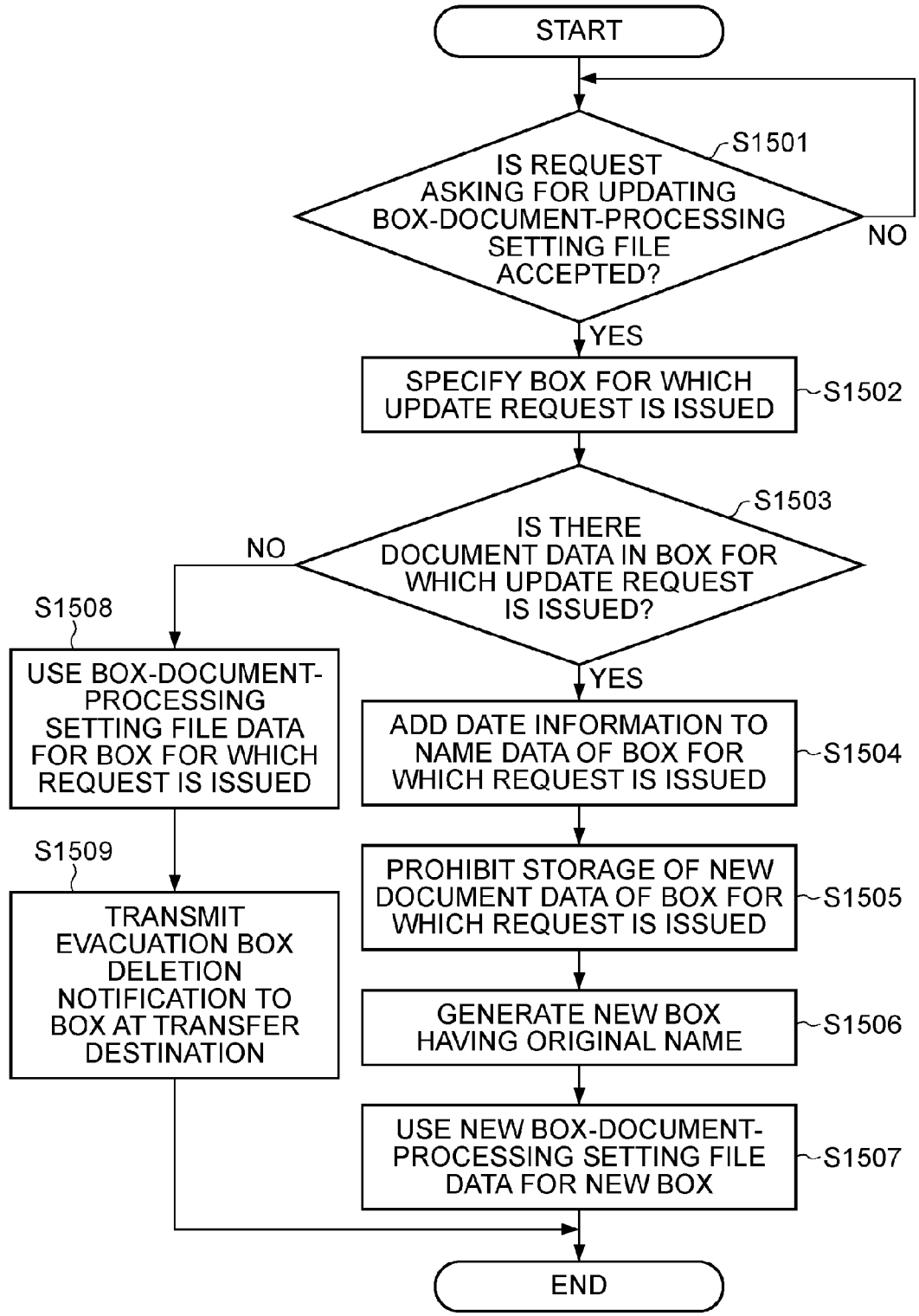
FIG. 15 is a flowchart showing processing procedures performed to update box-document-processing setting file data according to a third embodiment of the present invention.

FIG. 15 shows processing procedures performed to update the box-document-processing setting file data for the Box 1 of the image forming apparatus 130*a*.

At step S1501, the processing-request receiving section 276 monitors whether an external request to update the box-document-processing setting file data is accepted. When the administration user C transmits new box-document-processing setting file data to the Box 1, as an update request, the processing is caused to transition to step S1502 so that the data analysis section 272 determines for which box the update request was issued.

After the data analysis section 272 determines that the update request was issued for the Box 1 at step S1502, the data acquisition section 273 determines whether or not any document data exists in the Box 1 at step S1503. At that time, the data acquisition section 273 functions as a determining section determining whether or not data exists in the first storage location.

Since the document data items A and B exist in the Box 1 at that time, the data acquisition section 273 determines that the answer obtained at step S1503 is Yes, and the processing is caused to transition to step S1504.

If no data exists in the Box 1 at step S1503, the processing is caused to transition to step S1509 so that the box operation section 275A of the processing execution section 273 updates the box-document-processing setting file data stored in the box for which the update request was issued. After that, at step S1509, the communication section 275C of the processing execution section 275 transmits a request to delete an evacu-ation-destination box, by electronic mail, to the image forming apparatus 130*b* which is a transmission destination defined in the box-document-processing setting file data, and finishes the processing procedures.

At step S1504, the box operation section 275A of the processing execution section 275 adds predetermined information such as information relating to the date and time to data of the original name of the Box 1 included in the box document information 281. More specifically, the predetermined information is information about the time when the request to update the box-document-processing setting file data was issued. For example, if the date and time of the update is Oct. 27, 2007, at 21:00 pm, the new name of the box is determined to be Box1_200710272100. The new name may be generated by adding the predetermined information to the original name, or a different name may be used as the new name.

At step S1505, the box operation section 275A of the processing execution section 275 inhibits the storage of new document data, as the state of the Box1_200710272100 included in the box document information 281.

At step S1506, the box operation section 275A of the processing execution section 275 registers a new box with the box document information 281 by using the original name of the Box 1. Namely, the box operation section 275A generates the second storage location having the original name.

At step S1507, the data registration section 271 updates new box-document-processing setting file data that had been transmitted as the update request, as the box-document-processing setting file data of the Box1, and finishes the processing procedures. Namely, the data registration section 271 changes the setting information of the second storage location, as a change section.

In the above-described embodiment, for any box other than the first box of boxes aligned with one another, processing should be performed based on the update processing (shown in FIG. 11) performed for the box-document-processing setting file data, the update processing being described in the second embodiment. However, the details of data of a definition, which is added to box-document-processing setting file data 2-add' at step S1106, become the same as messages shown in FIG. 16.

Figures 16, 17:
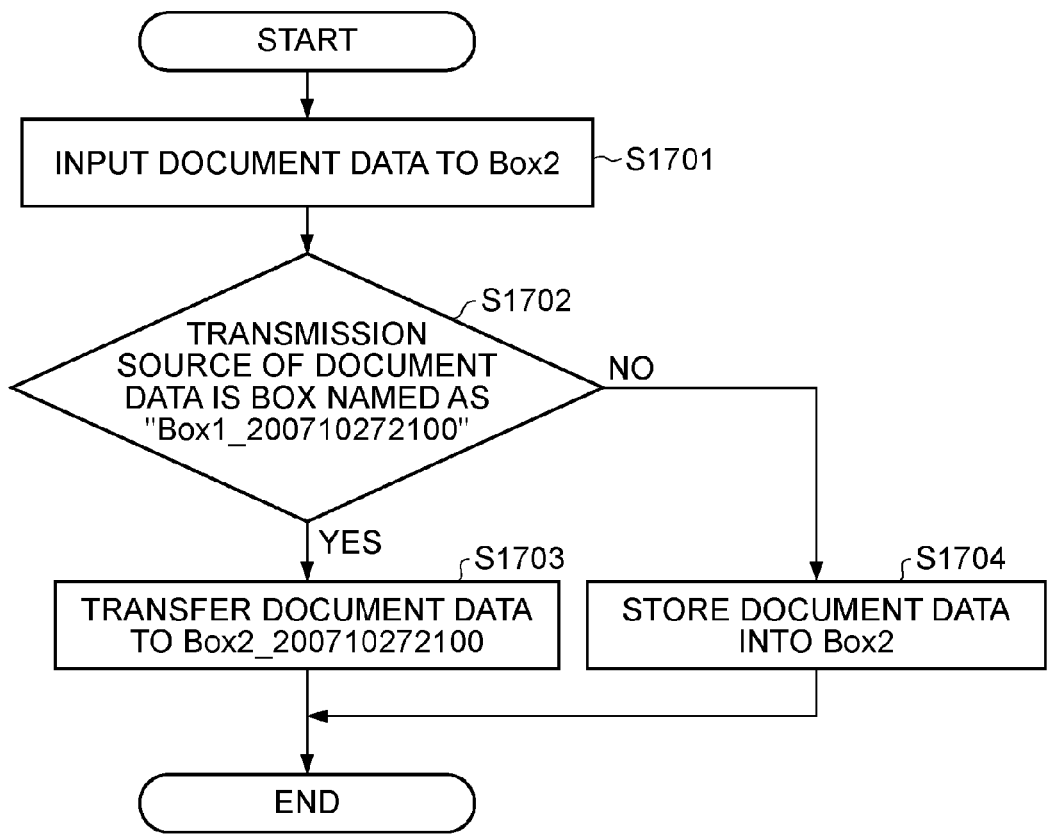
FIG. 16 shows exemplary box-document-processing setting file data 2-add' for addition of the second box of the second image forming apparatus according to the third embodiment.
FIG. 17 is a flowchart showing processing procedures performed to transfer document data according to the third embodiment.
Figure 27:
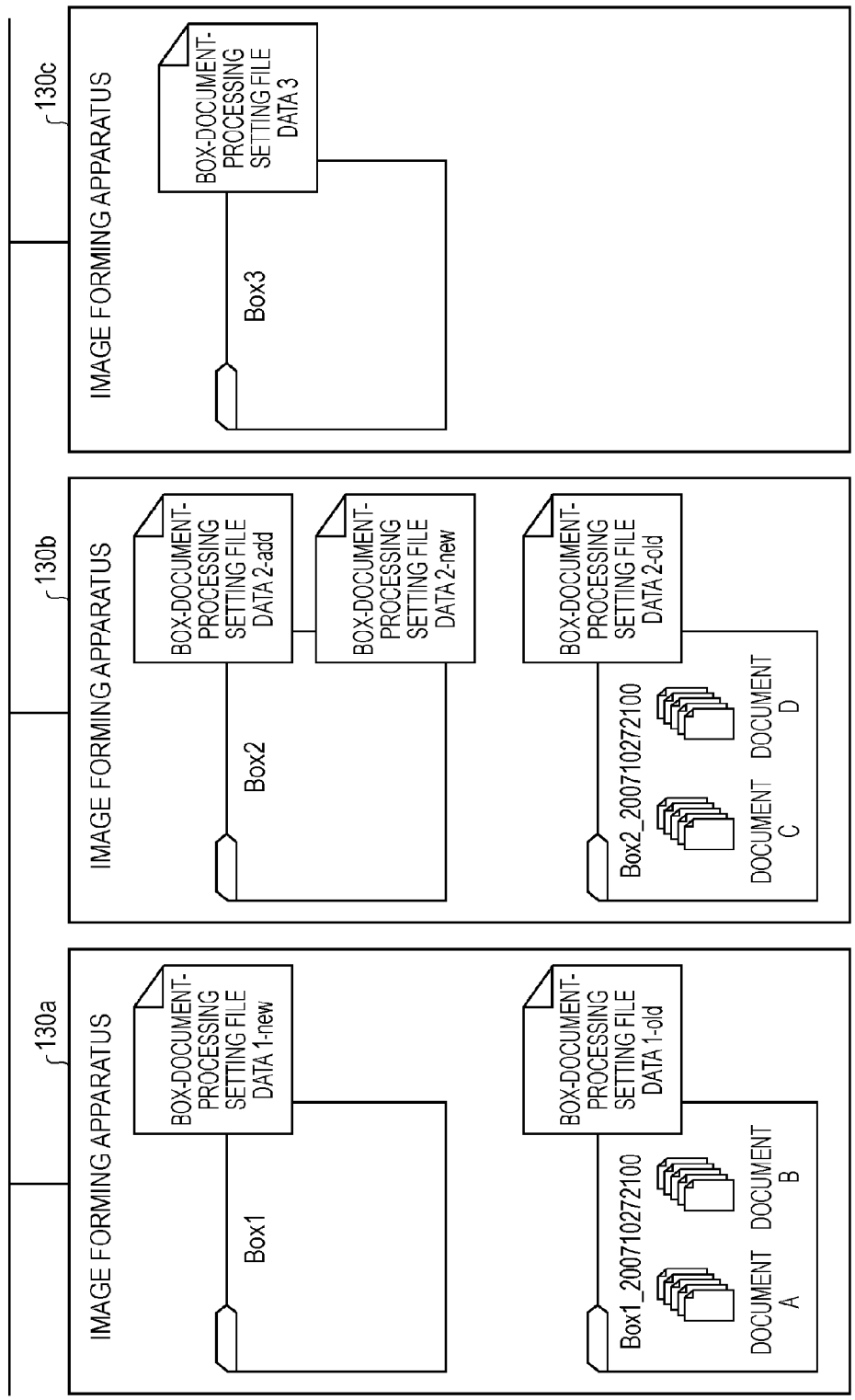
FIG. 27 is a configuration diagram illustrating the relationships between image forming apparatuses and folders, the relationships being established after processing is executed, according to the third embodiment.

According to the box-document-processing setting file data 2-add' shown in FIG. 16, the following job is executed when document data is stored. Namely, the document data is transferred to a predetermined box on condition that the transmission source is the Box1_200710272100. At that time, the transfer destination is determined to be the Box2_200710272100. When the above-described processing procedures are finished, the relationships between image forming apparatuses and folders, which are shown in FIG. 27, are obtained.

FIG. 17 shows processing procedures performed to transfer the document data items A and B according to the above-described embodiment. The document data items A and B that are processed through the Box1_200710272100 should be processed based on the box-document-processing setting file data which is still to be updated. Therefore, the document data items A and B should be transferred to the Box2_200710272100. That is to say, it may be arranged that the document data items A and B shall not be transferred to the Box 2 based on the box-document-processing setting file data set to the Box1_200710272100.

The above-described embodiment provides a function of dividing transferred document data items among appropriate boxes. Processing procedures performed to transfer the document data items will be described with reference to FIG. 17. The above-described transfer processing procedures include steps S1702 and S1703.

At step S1701, the data monitoring section 274 monitors whether or not document data is transmitted to the Box 2. If the monitoring section 274 detects that the document data is transmitted to the Box 2, the monitoring section 274 determines the transmission source (e.g., the third storage location) of document data transmitted from the processing request receiving section 276 at step S1702, as a monitoring section. Further, in addition to determining the transmission source, the data monitoring section 274 determines whether or not the document data is transmitted from a storage location having a changed name, as the monitoring section.

More specifically, if the determination result obtained at step S1701 shows that the transmission source box of the transmitted document data is the Box1_200710272100, the data processing section 275B of the processing execution section 275 transfers the transmitted document data to the Box2_200710272100. If document data other than the above-described document data is transmitted, the data processing section 275B of the processing execution section 275 stores the document data in the Box 2 and performs processing based on the box-document-processing setting file data set to the Box 2.

For example, as for the document data items A and B that had been stored in the Box 1 before the box-document-processing setting file data was updated, the name of the box storing the document items A and B is Box1_200710272100. Therefore, the document data items A and B are temporarily transferred to the Box 2, and further transferred to the Box2_200710272100. Further, document data stored in the Box 1 after the box-document-processing setting file data is updated is transferred to the Box 2 and stored in the Box 2 without being transferred to another box.

Figure 18:
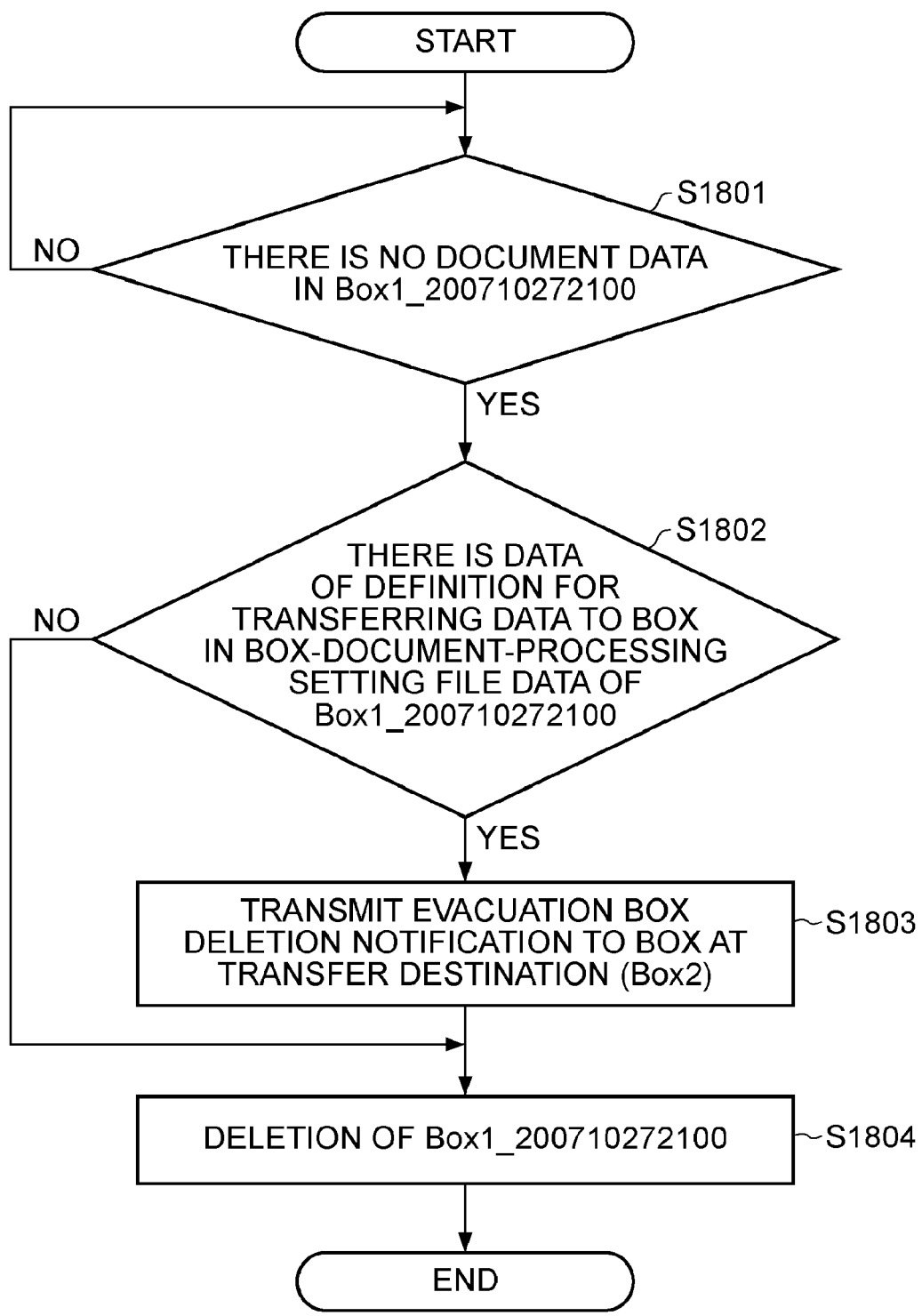
FIG. 18 is a flowchart showing processing procedures performed to delete a box generated through update processing performed for box-document-processing setting file data according to the third embodiment.

FIG. 18 shows processing procedures performed to delete the box which becomes unnecessary after each of the document data items stored in the box is deleted. In the above-described embodiment, the deletion processing procedures are performed for the Box1_200710272100 provided in the image forming apparatus 130a, which is the first box of the boxes aligned with one another. The deletion processing procedures will be described in detail with reference to FIG. 18. The deletion processing procedures include steps S1802 and S1803.

At step S1801, the data monitoring section 274 monitors whether or not the document data which is being processed in the Box1_200710272100 is moved and/or deleted. If the data monitoring section 274 detects that the document data is moved and/or deleted, the data acquisition section 273 determines whether or not any other document data is left in the box at step S1002. If the data acquisition section 273 determines that any document data is left in the box, the processing returns to step S1801.

If the data acquisition section 273 determines that no document data is left in the box at step S1801, the processing execution section 275 reads data of a box provided at the transfer destination, the information being written into the box-document-processing setting file data set to the Box1_200710272100 at step S1802.

Then, at step S1803, the communication section 275C of the processing execution section 275 transmits a request to delete an evacuation-destination box, by electronic mail, to the image forming apparatus 130b including the read box provided at the transfer destination. After that, the processing is caused to transition to step S1804 where the processing execution section 275 deletes the Box1_200710272100 included in the box-document information 281.

Figure 19:
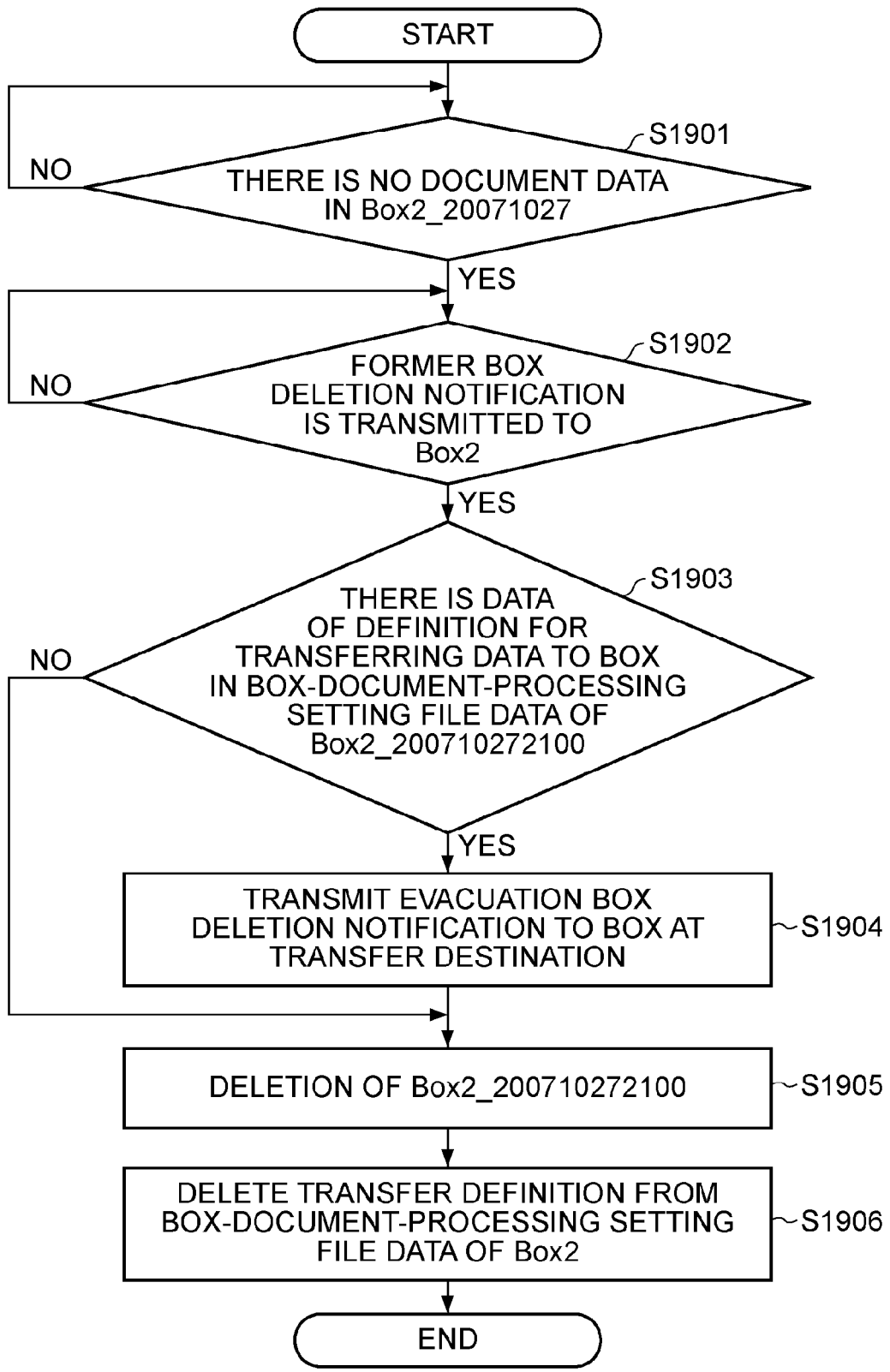
FIG. 19 is a flowchart showing processing procedures performed according to the third embodiment, where the processing procedures are performed to delete a box generated through the update processing performed for the box-document-processing setting file data according to the second embodiment.

FIG. 19 shows processing procedures performed to delete the Box2_200710272100 which is not the first box of the boxes aligned with one another. The deletion processing procedures shown in FIG. 19 include steps S1902, S1905, and S1906.

At step S1901, the data monitoring section 274 monitors whether or not the document data which is being processed in the Box2_200710272100 is moved and/or deleted. If the data monitoring section 274 detects that the document data is moved and/or deleted, the data acquisition section 273 determines whether or not any other document data is left in the box. If the data acquisition section 273 determines that any document data is left in the box, the processing returns to step S1901.

If the data acquisition section 273 determines that no document data is left in the box at step S1901, the processing request receiving section 276 detects whether or not the box deletion request is transmitted at step S1902.

If the box deletion request is transmitted to the processing request receiving section 276 at step S1902, the processing execution section 275 reads data of a box provided at the transfer destination, the information being written into the box-document-processing setting file data set to the Box2_200710272100 at step S1903. Since processing performed to transfer data to the box is not defined in the box-document-processing setting file data 2-old of the Box2_200710272100, the processing is caused to transition to step S1905.

At step S1905, the box operation section 275A of the processing execution section 275 deletes the Box2_200710272100 included in the box document information 281. After that, at step S1906, the data registration section 271 deletes information about a transfer definition 2-add, which had been added to the box-document-processing setting file data of the Box 2, and invalidates the processing performed to transfer data to the Box2_200710272100.

Therefore, if the request to update the box-document-processing setting file data is issued and transmitted to a plurality of boxes and no document data is stored in each of the boxes, a box to which the box-document-processing setting file data which is still to be updated is set is not prepared. Further, if the box to which the box-document-processing setting file data which is still to be updated is set is prepared, the deletion can be automatically performed.

Other Embodiments (1) Each of the workflow processing apparatuses according to the first, second, and third embodiments is used for the image forming apparatus. However, without being limited to the above-described embodiments, a workflow processing apparatus according to another embodiment of the present invention may be a printer, a facsimile, a scanner, a digital copier, and so forth.

(2) In each of the first, second, and third embodiments, data for processing is document data. However, without being limited to the above-described embodiments, data processed in a workflow processing apparatus according to another embodiment of the present invention includes different data such as image data and text data.

(3) In each of the first, second, and third embodiments, each of a plurality of the workflow processing apparatuses includes the first and second storage locations. However, according to another embodiment of the present invention, a single workflow processing apparatus may have a plurality of storage locations.

(4) In each of the first, second, and third embodiments, the box includes no folder. However, without being limited to the above-described embodiments, a hierarchical structure including folders may exist in the box. If the hierarchical structure exists, setting information such as the box-document-processing setting file data may exist in each of the folders, and processing may be performed for document data stored in each of the folders. Further, processing may be performed for each of document data items existing under the folder, such as a document data item stored in a subfolder provided under the folder. The setting information, that is, the box-document-processing setting file data may exist in the box so that document data existing in each of the folders that are provided in the box is processed.

(5) An information communication system according to an embodiment of the present invention can be achieved by storing a computer program implementing a workflow processing apparatus according to an embodiment of the present invention in a computer readable storage medium, and making a computer read and execute the computer program stored in the storage medium. Thus, the embodiments of the present invention have been described in detail with reference to the attached drawings. However, the specific configuration of the present invention is not limited to those indicated by the above-described embodiments. Namely, a design or the like included within the spirit of the present invention is also included in the specific configuration of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-184208 filed on Jul. 15, 2008, which is hereby incorporated by reference herein in its entirety.

What is claimed is:

1. A workflow processing apparatus executing processing procedures in sequence for data transmitted to a storage location based on setting information of a property of the processing procedures set for the storage location, the workflow processing apparatus comprising:
   a receiving unit configured to receive a request for updating the setting information which corresponds to a first storage location;
   a determining unit configured to determine whether or not the data exists in the first storage location when the receiving unit receives the request for updating the setting information which corresponds to the first storage location; and
   a controlling unit configured to change an original name of the first storage location in which the data exists to a new name, to generate a second storage location having the original name of the first storage location, and to use new setting information according to the request for the second storage location when the determining unit determines that the data exists in the first storage location,
   wherein, when there is no more data in the first storage location of which the name is changed to the new name, the controlling unit deletes the first storage location.

2. The workflow processing apparatus according to claim 1, wherein, when the receiving unit receives a request for updating the setting information, the controlling unit inhibits storing new data into the first storage location.

3. The workflow processing apparatus according to claim 1, wherein the controlling unit generates the new name for the first storage location by adding predetermined information to the original name.

4. The workflow processing apparatus according to claim 3, wherein the predetermined information is information relating to a date and time.

5. The workflow processing apparatus according to claim 1, further comprising:
   a monitoring unit configured to identify a third storage location which is a transmission source of the data stored in the second storage location and determine whether or not a name of the identified third storage location had been changed; and
   a data processing unit configured to transfer the data to the first storage location without performing processing in the case where the name of the third storage location had been changed.

6. The workflow processing apparatus according to claim 1, further comprising a communication unit configured to transmit a request to delete a different storage location to a transfer destination when no data exists in the first storage location of which name is changed to the new name and processing performed to transfer the data to the different storage location is defined in setting information of the first storage location.

7. The workflow processing apparatus according to claim 6, further comprising:
   a data processing unit configured to transfer the data to the first storage location without performing processing in the case where the name of the third storage location had been changed;
   wherein when the communication unit transmits the deletion request, the data processing unit does not perform the data transfer.

8. The workflow processing apparatus according to claim 1, wherein the controlling unit deletes the first storage location upon receiving an external request to delete the first storage location.

9. A method of controlling a workflow processing apparatus executing processing procedures in sequence for data transmitted to a storage location based on setting information of a property of the processing procedures set for the storage location, the method comprising the steps of:
   receiving a request for updating the setting information which corresponds to a first storage location;
   determining whether or not the data exists in the first storage location when receiving the request for updating the setting information which corresponds to the first storage location; and
   controlling an original name of the first storage location in which the data exists to a new name, to generate a second storage location having the original name of the first storage location, and to use new setting information according to the request for the second storage location when it is determined that the data exists in the first storage location,
   wherein, when there is no more data in the first storage location of which the name is changed to the new name, and the first storage location is deleted.

10. A non-transitory computer readable storage medium storing a program making a computer function as the workflow processing apparatus according to claim 1.

* * * * *